(12) United States Patent
Manolakos et al.

(10) Patent No.: US 11,317,245 B2
(45) Date of Patent: Apr. 26, 2022

(54) TIME-DOMAIN WAVEFORM REPORTING FOR POSITIONING

(71) Applicant: QUALCOMM Incorporated, San Diego, CA (US)

(72) Inventors: Alexandros Manolakos, San Diego, CA (US); Sony Akkarakaran, Poway, CA (US); Guttorm Ringstad Opshaug, Redwood City, CA (US); Sven Fischer, Nuremberg (DE); Joseph Binamira Soriaga, San Diego, CA (US); Tao Luo, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/813,345

(22) Filed: Mar. 9, 2020

(65) Prior Publication Data

US 2020/0296551 A1    Sep. 17, 2020

Related U.S. Application Data

(60) Provisional application No. 62/816,882, filed on Mar. 11, 2019.

(51) Int. Cl.
*H04W 24/00* (2009.01)
*H04W 4/029* (2018.01)
(Continued)

(52) U.S. Cl.
CPC .......... *H04W 4/029* (2018.02); *H04B 17/345* (2015.01); *H04W 24/08* (2013.01)

(58) Field of Classification Search
CPC ....... H04W 64/00; H04W 4/02; H04W 4/029; H04W 24/00; H04W 24/08;
(Continued)

(56) References Cited

U.S. PATENT DOCUMENTS

2007/0281624 A1* 12/2007 Thomas ............... H04B 7/0669
455/67.11
2014/0349582 A1   11/2014 Xiao et al.
(Continued)

FOREIGN PATENT DOCUMENTS

EP    3402258 A1    11/2018
GB    2124458 A     2/1984

OTHER PUBLICATIONS

International Search Report and Written Opinion—PCT/US2020/021871—ISA/EPO—dated Jun. 17, 2020.

*Primary Examiner* — Temica M Beamer
(74) *Attorney, Agent, or Firm* — Holland & Hart LLP

(57) ABSTRACT

Methods, systems, and devices for wireless communications are described. A user equipment (UE) may report measurements of a signal transmitted by a base station via a waveform. Based on the waveform, the base station may determine a position of the UE. The UE may measure the signal in a frequency band, where additional signaling in an adjacent frequency band causes interference on the signal. The UE may determine characteristics for measuring the signal based on the interference and may generate samples of the signal based on the measurement characteristics. Additionally, the UE may identify one or more antennas for measuring the signal and generate the samples based on the identified antennas. The UE may transmit the waveform report to the base station based on the samples. In some cases, the waveform may be based on a fractional symbol reporting scheme or a time mask with an offset and sampling rate.

34 Claims, 19 Drawing Sheets

(51) Int. Cl.
*H04W 24/08* (2009.01)
*H04B 17/345* (2015.01)

(58) Field of Classification Search
CPC ............ H04B 17/0042; H04B 17/0057; H04B
17/345; H04L 29/08657; H04L 1/0026;
H04L 1/0009; H04L 1/0003; H04L 1/20;
G01S 5/0252; G01S 5/02; G01S 5/14
USPC .......... 455/456.1, 456.2, 67.11, 67.13, 226.1
See application file for complete search history.

(56) References Cited

U.S. PATENT DOCUMENTS

| | | |
|---|---|---|
| 2015/0133157 A1 | 5/2015 | Xiao et al. |
| 2015/0208271 A1* | 7/2015 | Love .......................... G01S 5/10 370/252 |
| 2016/0149626 A1* | 5/2016 | Frenne ................... H04B 7/022 375/267 |
| 2018/0027518 A1 | 1/2018 | Sugumaran et al. |
| 2019/0037525 A1 | 1/2019 | Liu et al. |
| 2019/0239233 A1* | 8/2019 | Ryu ........................ H01Q 3/005 |
| 2020/0014475 A1* | 1/2020 | Chopra ................ H04B 17/318 |
| 2021/0091365 A1* | 3/2021 | Lin ......................... H01M 4/13 |

* cited by examiner

TIME-DOMAIN WAVEFORM REPORTING FOR POSITIONING

CROSS REFERENCE

The present Applications for Patent claims the benefit of U.S. Provisional Patent Application No. 62/816,882 by MANOLAKOS, et al., entitled "TIME-DOMAIN WAVEFORM REPORTING FOR POSITIONING," filed Mar. 11, 2019, assigned to the assignee hereof, and expressly incorporated herein.

BACKGROUND

The following relates generally to wireless communications, and more specifically to time-domain waveform reporting for positioning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). A wireless communications network may implement techniques to keep track of the position of a UE in the wireless communications network. In some cases, current techniques may be inefficient for handling interference, antenna configurations of the UE, signal reporting for determining the position of the UE, or similar issues when keeping track of the position of the UE.

SUMMARY

The described techniques relate to improved methods, systems, devices, and apparatuses that support time-domain waveform reporting for positioning. Generally, the described techniques provide for a user equipment (UE) receiving a request to report measurements of a signal transmitted by a base station. The UE may generate samples of the waveform and include the samples, or information determined from the samples, in a waveform report. Based on the waveform report, the base station may then determine a position of the UE. In some cases, the request to report the measurements may include instructions for the UE to measure a time domain waveform of the signal transmitted (e.g., by the base station) in a frequency resource (e.g., at least one component carrier (CC) or at least one bandwidth part (BWP)) for a measurement duration. Additionally, the UE may determine a sampling rate and/or a quantization level for measuring the signal transmitted by the base station (e.g., based on a filter class of the UE, a frequency band that corresponds to the CC or BWP, the measurement duration, etc.). Subsequently, the UE may generate time domain samples of the time domain waveform during the measurement duration based on the sampling rate and quantization level and transmit a waveform report to the base station based on the time domain samples. In some cases, the UE may determine an interference level the UE receives on an additional frequency resource (e.g., a frequency band, CC, or BWP) that is adjacent to the frequency resource (e.g., a frequency band, CC, or BWP) of the signal transmitted by the base station and may determine the sampling rate and/or quantization level based on the interference level.

Additionally or alternatively, after receiving the request to report the measurements, the UE may identify one or more antennas (e.g., one or more antenna ports) located on the UE to use for measuring the time-domain waveform. Accordingly, the UE may generate the time-domain samples of the time-domain waveform using the one or more identified antennas and may transmit the waveform report based on the time-domain samples. In some cases, the UE may identify one antenna, all of the antennas, or a subset of the antennas for performing the measurements of the time-domain waveform and generating the time-domain samples. Additionally, the UE may determine a sampling rate and/or a quantization level based on the identified antennas. In some cases, the UE may generate the time domain samples based on fractional symbol reporting scheme (e.g., generating the time domain samples over a fraction of a symbol, over a single symbol, or over multiple symbols). Additionally or alternatively, the time domain samples and waveform report may indicate a time mask with an offset and a sampling rate (e.g., including one or more starting points and corresponding durations for the measurements).

A method of wireless communications by a UE is described. The method may include receiving a waveform feedback request instructing the UE to measure a time domain waveform of a signal transmitted in a frequency resource (e.g., a CC or a BWP) over a measurement duration, determining a sampling rate, a quantization level, or both based on a filter class of the UE, a frequency band corresponding to the frequency resource, the measurement duration, or a combination thereof, generating time domain samples of the time domain waveform during the measurement duration based on the sampling rate, the quantization level, or both, and transmitting a waveform report based on the time domain samples.

An apparatus for wireless communications by a UE is described. The apparatus may include a processor, memory in electronic communication with the processor, and instructions stored in the memory. The instructions may be executable by the processor to cause the apparatus to receive a waveform feedback request instructing the UE to measure a time domain waveform of a signal transmitted in a frequency resource (e.g., a CC or a BWP) over a measurement duration, determine a sampling rate, a quantization level, or both based on a filter class of the UE, a frequency band corresponding to the frequency resource, the measurement duration, or a combination thereof, generate time domain samples of the time domain waveform during the measurement duration based on the sampling rate, the quantization level, or both, and transmit a waveform report based on the time domain samples.

Another apparatus for wireless communications by a UE is described. The apparatus may include means for receiving a waveform feedback request instructing the UE to measure a time domain waveform of a signal transmitted in a frequency resource (e.g., a CC or a BWP) over a measurement duration, determining a sampling rate, a quantization level, or both based on a filter class of the UE, a frequency band corresponding to the frequency resource, the measurement duration, or a combination thereof, generating time domain samples of the time domain waveform during the measurement duration based on the sampling rate, the quantization level, or both, and transmitting a waveform report based on the time domain samples.

A non-transitory computer-readable medium storing code for wireless communications by a UE is described. The code may include instructions executable by a processor to receive a waveform feedback request instructing the UE to measure a time domain waveform of a signal transmitted in a frequency resource (e.g., a CC or a BWP) over a measurement duration, determine a sampling rate, a quantization level, or both based on a filter class of the UE, a frequency band corresponding to the frequency resource, the measurement duration, or a combination thereof, generate time domain samples of the time domain waveform during the measurement duration based on the sampling rate, the quantization level, or both, and transmit a waveform report based on the time domain samples.

In some examples of the method, apparatuses, and non-transitory computer-readable medium described herein, determining the sampling rate and the quantization level may include operations, features, means, or instructions for determining the sampling rate and the quantization level based on a bandwidth of the frequency band.

In some examples of the method, apparatuses, and non-transitory computer-readable medium described herein, determining the sampling rate, the quantization level, or both may include operations, features, means, or instructions for determining an interference level within a second frequency band that may be adjacent to the frequency band, and determining the sampling rate, the quantization level, or both based on the interference level, a distance between the second frequency band and the frequency band, or a combination thereof.

In some examples of the method, apparatuses, and non-transitory computer-readable medium described herein, determining the sampling rate, the quantization level, or both may include operations, features, means, or instructions for determining an interference level within a CC that is adjacent to the frequency resource, and determining the sampling rate, the quantization level, or both based on the interference level, a distance between the CC and the frequency resource, or a combination thereof.

In some examples of the method, apparatuses, and non-transitory computer-readable medium described herein, determining the sampling rate, the quantization level, or both may include operations, features, means, or instructions for determining an interference level within a BWP that is adjacent to the frequency resource, and determining the sampling rate, the quantization level, or both based on the interference level, a distance between the BWP and the frequency resource, or a combination thereof.

In some examples of the method, apparatuses, and non-transitory computer-readable medium described herein, the waveform report may indicate the sampling rate, the quantization level, or both.

A method of wireless communications by a UE is described. The method may include receiving a waveform feedback request instructing the UE to measure a time domain waveform of a signal, identifying one or more antenna ports of the UE to use for measuring the time domain waveform, generating time domain samples of the time domain waveform using the one or more antenna ports, and transmitting a waveform report based on the time domain samples.

An apparatus for wireless communications by a UE is described. The apparatus may include a processor, memory in electronic communication with the processor, and instructions stored in the memory. The instructions may be executable by the processor to cause the apparatus to receive a waveform feedback request instructing the UE to measure a time domain waveform of a signal, identify one or more antenna ports of the UE to use for measuring the time domain waveform, generate time domain samples of the time domain waveform using the one or more antenna ports, and transmit a waveform report based on the time domain samples.

Another apparatus for wireless communications by a UE is described. The apparatus may include means for receiving a waveform feedback request instructing the UE to measure a time domain waveform of a signal, identifying one or more antenna ports of the UE to use for measuring the time domain waveform, generating time domain samples of the time domain waveform using the one or more antenna ports, and transmitting a waveform report based on the time domain samples.

A non-transitory computer-readable medium storing code for wireless communications by a UE is described. The code may include instructions executable by a processor to receive a waveform feedback request instructing the UE to measure a time domain waveform of a signal, identify one or more antenna ports of the UE to use for measuring the time domain waveform, generate time domain samples of the time domain waveform using the one or more antenna ports, and transmit a waveform report based on the time domain samples.

In some examples of the method, apparatuses, and non-transitory computer-readable medium described herein, identifying the one or more antenna ports of the UE may include operations, features, means, or instructions for selecting a first antenna port of a set of antenna ports for measuring the time domain waveform.

In some examples of the method, apparatuses, and non-transitory computer-readable medium described herein, selecting the first antenna port may include operations, features, means, or instructions for selecting the first antenna port based on comparing energy received at the first antenna port relative to energy received at one or more other antenna ports of the set of antenna ports.

Some examples of the method, apparatuses, and non-transitory computer-readable medium described herein may further include operations, features, means, or instructions for cycling between each antenna port of the set of antenna ports for measuring the time domain waveform in a reporting opportunity, and generating the waveform report for each reporting opportunity based on the time domain samples of the time domain waveform measured by a respective one of the set of antenna ports.

In some examples of the method, apparatuses, and non-transitory computer-readable medium described herein, identifying the one or more antenna ports of the UE may include operations, features, means, or instructions for receiving an indication of which of the one or more antenna ports of the UE to use for generating the time domain samples.

In some examples of the method, apparatuses, and non-transitory computer-readable medium described herein, generating the time domain samples of the time domain waveform may include operations, features, means, or instructions for generating the time domain samples of the time domain waveform using each of the one or more antenna ports, where the waveform report indicates feedback for up to all of the one or more antenna ports.

In some examples of the method, apparatuses, and non-transitory computer-readable medium described herein, generating the time domain samples of the time domain waveform may include operations, features, means, or instructions for determining a sampling rate, a quantization level, or both based on a number of the one or more antenna ports to be used for generating the time domain samples, and generating the time domain samples based on the sampling rate, the quantization level, or both.

In some examples of the method, apparatuses, and non-transitory computer-readable medium described herein, generating the time domain samples of the time domain waveform may include operations, features, means, or instructions for generating first time domain samples of the time domain waveform using a first antenna port during a first time interval, generating second time domain samples of the time domain waveform using a second antenna port during a second time interval, and generating the waveform report based on the first and second time domain samples.

In some examples of the method, apparatuses, and non-transitory computer-readable medium described herein, identifying the one or more antenna ports of the UE may include operations, features, means, or instructions for selecting a subset of the one or more antenna ports for measuring the time domain waveform.

In some examples of the method, apparatuses, and non-transitory computer-readable medium described herein, selecting the subset of the one or more antenna ports may include operations, features, means, or instructions for selecting the subset of the one or more antenna ports based on sets of cross-poled antenna ports within the one or more antenna ports, where one antenna port from each set of the cross-poled antenna ports may be selected for the subset of the one or more antenna ports.

Some examples of the method, apparatuses, and non-transitory computer-readable medium described herein may further include operations, features, means, or instructions for generating the waveform report based on a sum of energy of the time domain waveform received by a respective antenna port of the one or more antenna ports.

In some examples of the method, apparatuses, and non-transitory computer-readable medium described herein, the sum of the energy may be a non-coherent energy summation.

Some examples of the method, apparatuses, and non-transitory computer-readable medium described herein may further include operations, features, means, or instructions for generating the waveform report based on determining a compression of the time domain samples of the time domain waveform measured at respective antenna ports of the one or more antenna ports.

In some examples of the method, apparatuses, and non-transitory computer-readable medium described herein, the compression may include a differential compression of differences between individual amplitudes of each of the time domain samples.

In some examples of the method, apparatuses, and non-transitory computer-readable medium described herein, the waveform report may indicate separate phases of the time domain samples of the time domain waveform measured at each antenna port of the one or more antenna ports.

In some examples of the method, apparatuses, and non-transitory computer-readable medium described herein, generating the time domain samples of the time domain waveform may include operations, features, means, or instructions for generating the time domain samples over a time duration that spans a fraction of a symbol, a single symbol, or a set of symbols.

In some examples of the method, apparatuses, and non-transitory computer-readable medium described herein, the waveform report may indicate a time mask with offset and a sampling rate.

In some examples of the method, apparatuses, and non-transitory computer-readable medium described herein, the waveform report may indicate a measurement starting point and a sampling rate.

In some examples of the method, apparatuses, and non-transitory computer-readable medium described herein, the waveform report may indicate a set of measurement starting points and a corresponding set of measurement durations, the set of measurement durations occurring consecutively, in disjoint durations, or a combination thereof.

Some examples of the method, apparatuses, and non-transitory computer-readable medium described herein may further include operations, features, means, or instructions for receiving control signaling configuring the UE with at least one measurement starting point and at least one measurement duration.

Some examples of the method, apparatuses, and non-transitory computer-readable medium described herein may further include operations, features, means, or instructions for selecting a sampling rate based on the at least one measurement starting point and the at least one measurement duration, where the time domain samples of the time domain waveform may be generated based on the sampling rate, and where the waveform report indicates the sampling rate.

A method of wireless communications by a base station is described. The method may include transmitting a waveform feedback request instructing a UE to measure a time domain waveform of a signal transmitted in a frequency resource (e.g., a CC or a BWP) over a measurement duration, transmitting the signal in the frequency resource at least during the measurement duration, and receiving a waveform report from the UE.

An apparatus for wireless communications by a base station is described. The apparatus may include a processor, memory in electronic communication with the processor, and instructions stored in the memory. The instructions may be executable by the processor to cause the apparatus to transmit a waveform feedback request instructing a UE to measure a time domain waveform of a signal transmitted in a frequency resource (e.g., a CC or a BWP) over a measurement duration, transmit the signal in the frequency resource at least during the measurement duration, and receive a waveform report from the UE.

Another apparatus for wireless communications by a base station is described. The apparatus may include means for transmitting a waveform feedback request instructing a UE to measure a time domain waveform of a signal transmitted in a frequency resource (e.g., a CC or a BWP) over a measurement duration, transmitting the signal in the frequency resource at least during the measurement duration, and receiving a waveform report from the UE.

A non-transitory computer-readable medium storing code for wireless communications by a base station is described. The code may include instructions executable by a processor to transmit a waveform feedback request instructing a UE to measure a time domain waveform of a signal transmitted in a frequency resource (e.g., a CC or a BWP) over a measurement duration, transmit the signal in the frequency resource at least during the measurement duration, and receive a waveform report from the UE.

Some examples of the method, apparatuses, and non-transitory computer-readable medium described herein may further include operations, features, means, or instructions for determining a location of the UE based on the waveform report.

In some examples of the method, apparatuses, and non-transitory computer-readable medium described herein, the waveform report may indicate feedback generated based on time domain samples of the time domain waveform, a sampling rate of the time domain samples, a quantization level of the time domain samples, or a combination thereof.

Some examples of the method, apparatuses, and non-transitory computer-readable medium described herein may further include operations, features, means, or instructions for applying digital filtering to the feedback to generate filtered feedback based on the sampling rate the quantization level, or both, and determining a location of the UE based on the filtered feedback.

A method of wireless communications by a base station is described. The method may include transmitting a waveform feedback request instructing a UE to measure a time domain waveform of a signal during a measurement duration and an indication of one or more antenna ports the UE is to use for generating time domain samples of the time domain waveform, transmitting the signal in a frequency resource (e.g., a CC or a BWP) at least during the measurement duration, and receiving a waveform report from the UE generated based on time domain samples of the time domain waveform.

An apparatus for wireless communications by a base station is described. The apparatus may include a processor, memory in electronic communication with the processor, and instructions stored in the memory. The instructions may be executable by the processor to cause the apparatus to transmit a waveform feedback request instructing a UE to measure a time domain waveform of a signal during a measurement duration and an indication of one or more antenna ports the UE is to use for generating time domain samples of the time domain waveform, transmit the signal in a frequency resource (e.g., a CC or a BWP) at least during the measurement duration, and receive a waveform report from the UE generated based on time domain samples of the time domain waveform.

Another apparatus for wireless communications by a base station is described. The apparatus may include means for transmitting a waveform feedback request instructing a UE to measure a time domain waveform of a signal during a measurement duration and an indication of one or more antenna ports the UE is to use for generating time domain samples of the time domain waveform, transmitting the signal in a frequency resource (e.g., a CC or a BWP) at least during the measurement duration, and receiving a waveform report from the UE generated based on time domain samples of the time domain waveform.

A non-transitory computer-readable medium storing code for wireless communications by a base station is described. The code may include instructions executable by a processor to transmit a waveform feedback request instructing a UE to measure a time domain waveform of a signal during a measurement duration and an indication of one or more antenna ports the UE is to use for generating time domain samples of the time domain waveform, transmit the signal in a frequency resource (e.g., a CC or a BWP) at least during the measurement duration, and receive a waveform report from the UE generated based on time domain samples of the time domain waveform.

In some examples of the method, apparatuses, and non-transitory computer-readable medium described herein, the waveform report may indicate a time mask with offset and a sampling rate.

In some examples of the method, apparatuses, and non-transitory computer-readable medium described herein, the waveform report may indicate a measurement starting point and a sampling rate.

In some examples of the method, apparatuses, and non-transitory computer-readable medium described herein, the waveform report may indicate a set of measurement starting points and a corresponding set of measurement durations, the set of measurement durations occurring consecutively, in disjoint durations, or a combination thereof.

Some examples of the method, apparatuses, and non-transitory computer-readable medium described herein may further include operations, features, means, or instructions for determining a location of the UE based on the waveform report.

Some examples of the method, apparatuses, and non-transitory computer-readable medium described herein may further include operations, features, means, or instructions for transmitting control signaling configuring the UE with at least one measurement starting point and at least one measurement point.

In some examples of the method, apparatuses, and non-transitory computer-readable medium described herein, the waveform report may indicate feedback generated based on a sampling rate.

Some examples of the method, apparatuses, and non-transitory computer-readable medium described herein may further include operations, features, means, or instructions for determining a location of the UE based on the sampling rate.

Some examples of the method, apparatuses, and non-transitory computer-readable medium described herein may further include operations, features, means, or instructions for applying digital filtering to the feedback to generate filtered feedback based on the sampling rate, and determining a location of the UE based on the filtered feedback.

DETAILED DESCRIPTION

Figure 1:
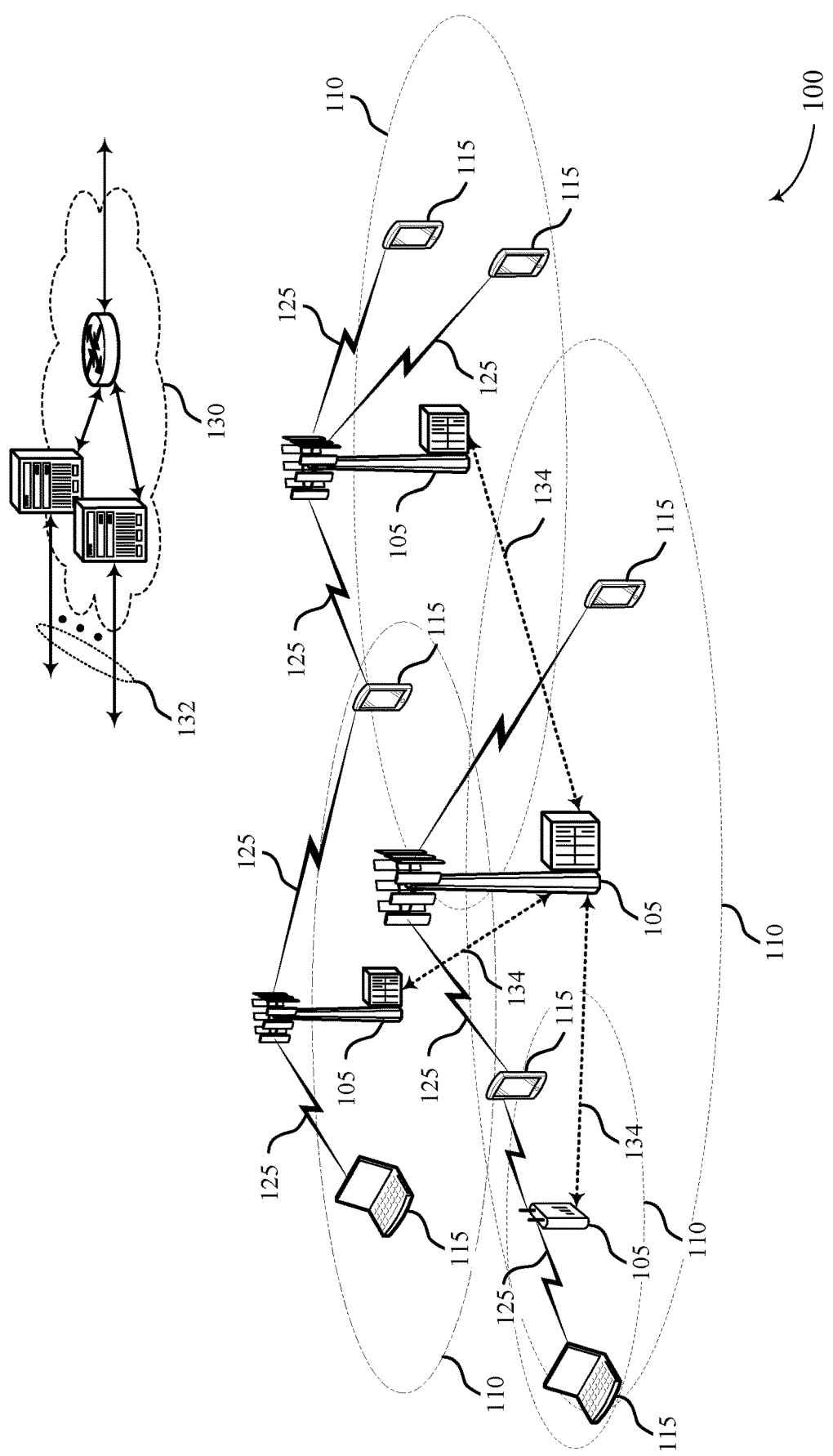
FIG. 1 illustrates an example of a system for wireless communications in accordance with aspects of the present disclosure.

In some wireless communications systems (e.g., New Radio (NR)), wireless devices in the system may determine a position of a user equipment (UE) based on a received signal waveform reporting mechanism. For example, the wireless devices may digitize and record a waveform of one or more received signals (e.g., at configured time-intervals) at either side of a communications link (e.g., at the UE side transmitting the waveform, at the base station receiving side, both, or any other network entity) and report the received signal waveform to a location server or the base station. Accordingly, the location server or base station may utilize the received signal waveform report and transmitted signals within the waveform (e.g., reference signals) to perform measurements of signal location parameters to determine the position of the UE.

As described herein, the UE may receive a request to report measurements of a signal (e.g., transmitted by a base station). In some cases, the request may include instructions for the UE to measure a time domain waveform of the signal transmitted by the base station in a frequency resource (e.g., at least one component carrier (CC) or at least one bandwidth part (BWP)) for a measurement duration. Accordingly, the UE may determine a sampling rate (e.g., how often to measure the signal) and/or a quantization level (e.g., a granularity for measuring the signal) for measuring the signal transmitted by the base station based on one or more of a filter class of the UE, a frequency band that corresponds to the frequency resource, the measurement duration, or the like. The UE may then generate time domain samples of the time domain waveform during the measurement duration based on the sampling rate and quantization level and transmit a waveform report to the base station based on the time domain samples. In some cases, the UE may determine an interference level based on additional signaling the UE receives on a frequency band, CC, or BWP (e.g., an additional frequency resource) that is adjacent to the frequency resource of the signal transmitted by the base station for the measurements and may determine the sampling rate, the quantization level, or both based on the interference level.

Additionally or alternatively, after receiving the request to report the measurements, the UE may identify one or more antennas (e.g., one or more antenna ports) located on the UE to use for measuring the time-domain waveform. Accordingly, the UE may generate the time-domain samples of the time-domain waveform using the one or more identified antennas and may transmit the waveform report based on the time-domain samples. In some cases, the UE may identify one antenna, all of the antennas, or a subset of the antennas for performing the measurements of the time-domain waveform and generating the time-domain samples. Additionally, the UE may determine a sampling rate, a quantization level, or both based on the identified antennas. In some cases, the UE may generate the time domain samples and report the corresponding waveform based on fractional symbol reporting scheme (e.g., generating the time domain samples over a fraction of a symbol, over a single symbol, or over multiple symbols). Additionally or alternatively, the time domain samples and waveform report may indicate a time mask with an offset and a sampling rate (e.g., including one or more starting points and corresponding durations for the measurements).

Aspects of the disclosure are initially described in the context of a wireless communications system. Additionally, aspects of the disclosure are illustrated by an additional wireless communications system, a multiple antenna configuration of a UE, and process flow examples. Aspects of the disclosure are further illustrated by and described with reference to apparatus diagrams, system diagrams, and flowcharts that relate to time-domain waveform reporting for positioning.

FIG. 1 illustrates an example of a wireless communications system 100 that supports time-domain waveform reporting for positioning in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A serving base station 105 (or a location server) of a UE 115 may keep track of the location or position of the UE 115. Various positioning techniques may be used to track the UE 115. In some examples, the UE 115 may be configured to transmit one or more uplink positioning reference signals (PRSs) to the serving base station 105 and one or more neighboring base stations 105, or the UE 115 may be configured to receive one or more downlink PRSs from the serving base station 105 and one or more neighboring base stations 105. In some implementations, an uplink PRS, or downlink PRS, or both may be transmitted on a channel defined exclusively for positioning purposes or may be transmitted on a channel or signal utilized for separate signaling (such as synchronization signals, channel-state information reference signals (CSI-RSs), sounding reference signal (SRSs), etc.), which may also be used for determining a position of the UE 115.

For an uplink PRS, the base station 105 and the neighboring base stations 105 may exchange, for example via backhaul links, information associated with the receipt of the uplink PRSs, such as reference signal time difference (RSTD) measurements. The network (including the location server, the base stations 105, or both) may then determine the location of the UE 115 based on the one or more uplink PRS transmissions. For downlink PRS transmissions, the UE 115 may receive a PRS (or other signaling) from each of one or more base stations 105. In some examples, the UE 115 may estimate its position based on measurements, for example, RSTD measurements performed by the UE 115 on the downlink PRS transmissions. Additionally or alternatively, the UE 115 may transmit measurement reports for the one or more downlink PRSs to a serving base station 105 (which may forward the measurement reports to the location server).

Generally, a positioning technique may be UE-based or UE-assisted. In UE-based positioning, the UE 115 may perform the position estimation without feeding back RSTD measurements to the network (for example, via a base station 105). In UE-assisted positioning, the UE 115 may provide the RSTD measurements, and the network (e.g., serving base station 105, the location server, etc.) may perform the positioning estimation using the RSTD measurements. A UE 115 may be configured for a UE-based mode, a UE-assisted mode, or a mode which incorporates aspects of both. The positioning mode may be selected based on a connection initialization configuration, downlink control information (DCI), a MAC control element (CE), etc.

In some wireless communications systems (e.g., NR), wireless devices (e.g., a UE 115, associated base stations 105 of the UE 115, a location server, etc.) may determine a position of a UE 115 based on a received signal waveform reporting mechanism. For example, the wireless devices may digitize and record a waveform of one or more received signals (e.g., at configured time-intervals) at either side of a communications link (e.g., at the UE side transmitting the waveform, at the base station receiving side, both, or any other network entity) and report the received signal waveform to a location server or a base station 105. Accordingly, the location server or base station 105 may utilize the received signal waveform report and transmitted signals within the waveform (e.g., reference signals) to perform measurements of signal location parameters to determine the position of the UE 115 (e.g., a UE positioning or location). However, conventional techniques for determining the position of the UE 115 or generating the waveform may be inefficient for handling interference, antenna configurations of the UE 115, signal reporting for determining the position of the UE 115, or similar issues when keeping track of the position of the UE 115.

Wireless communications system 100 may resolve these inefficiencies, where a UE 115 may receive a request to report measurements of a signal transmitted by a base station 105. In some cases, the request may include instructions for the UE 115 to measure a time domain waveform of the signal transmitted by the base station 105 in a frequency resource (e.g., at least one CC, at least one BWP, or at least one frequency band) for a measurement duration. Accordingly, the UE 115 may determine a sampling rate (e.g., how often to measure the signal), a quantization level (e.g., a granularity for measuring the signal), or both for measuring the signal transmitted by the base station 105 based on one or more of a filter class of the UE 115, a frequency band that corresponds to the frequency resource, a bandwidth of the frequency band, or the measurement duration, or the like. In some cases, the UE 115 may determine an interference level based on additional signaling the UE 115 receives on a frequency band, CC, or BWP that is adjacent to the signal transmitted by the base station 105 (e.g., in the frequency resource) for the measurements and may determine the sampling rate, the quantization level, or both based on the interference level.

Additionally or alternatively, after receiving the request to report the measurements, the UE 115 may identify one or more antennas (e.g., one or more antenna ports) located on the UE 115 to use for measuring the time-domain waveform. In some cases, the UE 115 may identify one antenna, all of the antennas, or a subset of the antennas for performing the measurements of the time-domain waveform and generating the time-domain samples and may determine a sampling rate, a quantization level, or both based on the identified antennas. The UE 115 may then generate time domain samples of the time domain waveform during the measurement duration based on the sampling rate, the quantization level, or both (e.g., as determined based on the interference level, the filter class of the UE 115, the identified antennas, etc.) and transmit a waveform report to the base station 105 based on the time domain samples. In some cases, the UE 115 may generate the time domain samples and report a corresponding waveform, where the waveform is based on fractional symbol reporting scheme (e.g., generating the time domain samples over a fraction of a symbol, over a single symbol, or over multiple symbols) or may indicate a time mask with an offset and a sampling rate (e.g., including one or more starting points and corresponding durations for the measurements).

Figure 2:
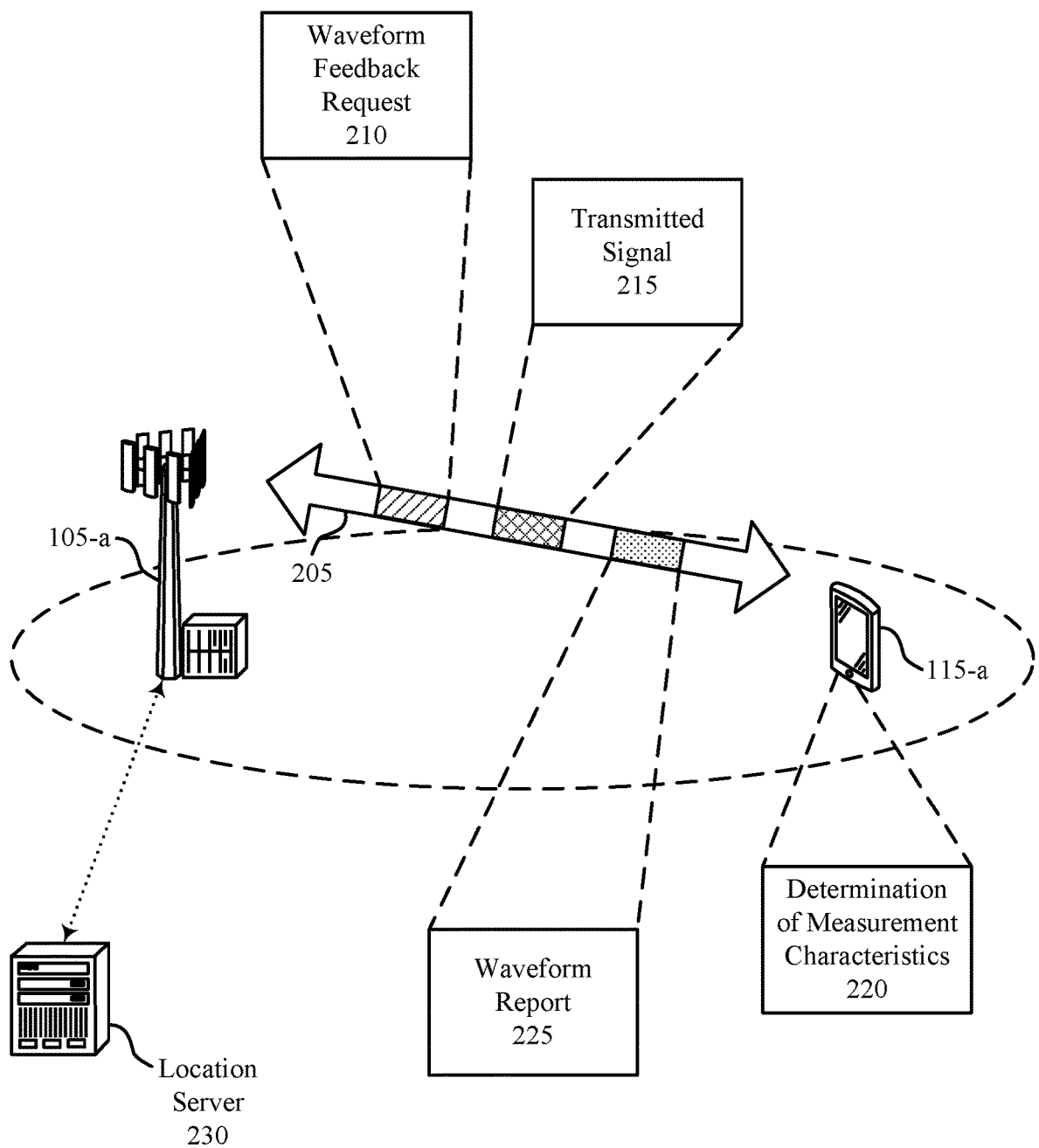
FIG. 2 illustrates an example of a wireless communications system in accordance with aspects of the present disclosure.

FIG. 2 illustrates an example of a wireless communications system 200 that supports time-domain waveform reporting for positioning in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115, respectively, as described above with reference to FIG. 1. Base station 105-*a* and UE 115-*a* may communicate on resources of a carrier 205. In some cases, the resources of carrier 205 may be split into separate resource groups. For example, the resources may include one or more CCs (e.g., for dual connectivity or carrier aggregation), one or more BWPs, one or more sets of frequency resources, or a similar separation of resources. Additionally, the communications on carrier 205 may be transmitted according to beamformed transmissions.

As described herein, wireless communications system 200 may support a waveform reporting mechanism for determining a position of UE 115-*a*. For example, base station 105-*a* may transmit a waveform feedback request 210 (e.g., on carrier 205) that includes instructions for UE 115-*a* to measure a transmitted signal 215 (e.g., PRSs or other reference signals transmitted in a time domain waveform received at UE 115-*a* on resources of carrier 205) from base station 105-*a*. Subsequently, UE 115-*a* may perform a determination of measurement characteristics 220 for measuring transmitted signal 215 (e.g., time domain samples of power measurements, signal-to-noise ratios (SNRs), signal-to-interference-plus-noise ratios (SINRs), RSTD measurements, etc.) and may transmit a waveform report 225 (e.g., on carrier 205) to base station 105-*a* that includes the measurements according to the determined measurement characteristics. In some cases, the measurement characteristics may include a sampling rate and/or a quantization level for measuring the transmitted signal 215. For example, the sampling rate may indicate how often UE 115-*a* takes the measurements of transmitted signal 215. Additionally or alternatively, the quantization level may indicate a number of bits used for reporting the different measurements of transmitted signal 215. For example, a higher quantization level may indicate a higher number of bits to be used for conveying the measurements. As such, a higher number of bits may result in a higher granularity and more accurate measurement indication (e.g., closer to the actual measurement). However, higher granularity levels (e.g., and higher numbers of bits) may result in a higher signaling overhead for reporting the measurements.

In some cases, UE 115-*a* may be asked to report a time-domain received waveform of a signal transmitted in a first frequency resource (e.g., one CC, BWP, frequency band, etc.), for example in waveform feedback request 210, while there is a strong interfering signal transmitted in an adjacent frequency resource (e.g., an adjacent CC, BWP, or corresponding adjacent frequency band). As such, the measurements of transmitted signal 215 (e.g., time-domain samples) may be dominated by the interfering signal depending on the effectiveness of the analog filtering at UE 115-a. In some cases, the sampling rate, the level of quantization, or both of the measurements of transmitted signal 215 (or feedback size) may be different for transmitted signal 215 (e.g., the time-domain received waveform) depending on a size of the frequency band measured for waveform report 225, characteristics of the interfering signal, a carrier frequency for transmitted signal 215, an analog filter class at UE 115-a, or a combination thereof.

When an interfering signal is detected in an adjacent frequency resource (e.g., adjacent CC, BWP, or corresponding adjacent frequency band), UE 115-a may determine an interference level corresponding to the interfering signal and determine the sampling rate and/or quantization level for waveform report 225 based on the interference level. In some cases, the interference level may be a maximum interference level in the adjacent frequency resource (e.g., a second CC, BWP, frequency band, or frequency resource) and may not be a measurement of the interfering signal (e.g., the actual interference). Additionally or alternatively, the interference level may be a measured interference level during a period of time prior to UE 115-a receiving waveform feedback request 210.

For the size of the frequency band that needs to be measured of transmitted signal 215 for waveform report 225, if the frequency band is very small, even if analog filtering by UE 115-a is relatively sharp (e.g., more efficient at filtering out interfering signals), there may be higher leaking interference (e.g., from the interfering signal onto transmitted signal 215) inside the frequency band of transmitted signal 215. Additionally or alternatively, the characteristics of the interfering signal may include whether the interfering signal is present or not, the strength of the interfering signal in the adjacent frequency bands (e.g., adjacent CCs, BWPs, frequency resource in the adjacent bands), and a distance of a bandwidth of the interfering signal to the frequency band of transmitted signal 215. For example, the strength of any additional signal transmitted in the adjacent bands (or adjacent CCs, BWPs, frequency resource, etc.) may impact transmitted signal 215. If UE 115-a is expected to measure a 10 MHz frequency band in a frequency resource such that no other strong signal is expected within five (5) MHz from that 10 MHz frequency band, then the quantization level may not be of high precision (e.g., a lower quantization level). In some cases, the interfering signal may be a separate transmission from base station 105-a, a neighboring base station 105, a nearby UE 115, or another wireless device transmitting on adjacent frequency bands (or CCs, BWPs, frequency resource, etc.) to the frequency band for transmitted signal 215.

Based on a carrier frequency for transmitted signal 215 (e.g., a frequency range 1 (FR1), a frequency range 2 (FR2), etc.), different quantization levels and sampling rates may be expected for waveform report 225. Additionally or alternatively, if analog filtering at UE 115-a is good (e.g., sharp in the edges), then quantization levels used for waveform report 225 might not to be of a high precision (e.g., lower quantization levels that result in less feedback). However, if analog filtering is bad at UE 115-a, UE 115-a may report measurements of transmitted signal 215 in waveform report 225 (e.g., time domain samples) with high precision (e.g., higher quantization levels, more frequent sampling rates, or both) so that base station 105-a (e.g., the recipient of the feedback) can filter out noise or interference from the useful signal (e.g., the measurements of transmitted signal 215).

In some cases, base station 105-a may then transmit the waveform report 225 and/or its corresponding measurements to a location server 230. Location server 230 may receive waveform reports (and measurements) for multiple UEs 115 (including UE 115-a) from base station 105-a, from multiple base stations 105 for corresponding UEs 115, directly from the UEs 115 (including UE 115-a), or a combination thereof. Accordingly, location server 230 may determine locations or positions of each UE 115 within wireless communications system 200. In some cases, location server 230 may transmit an indication of the different locations or positions of each UE 115 to one or more base stations 105 in wireless communications system 200 (e.g., including all base stations 105 in wireless communications system 200), one or more UEs 115 in wireless communications system 200, or a combination thereof.

Figure 3:
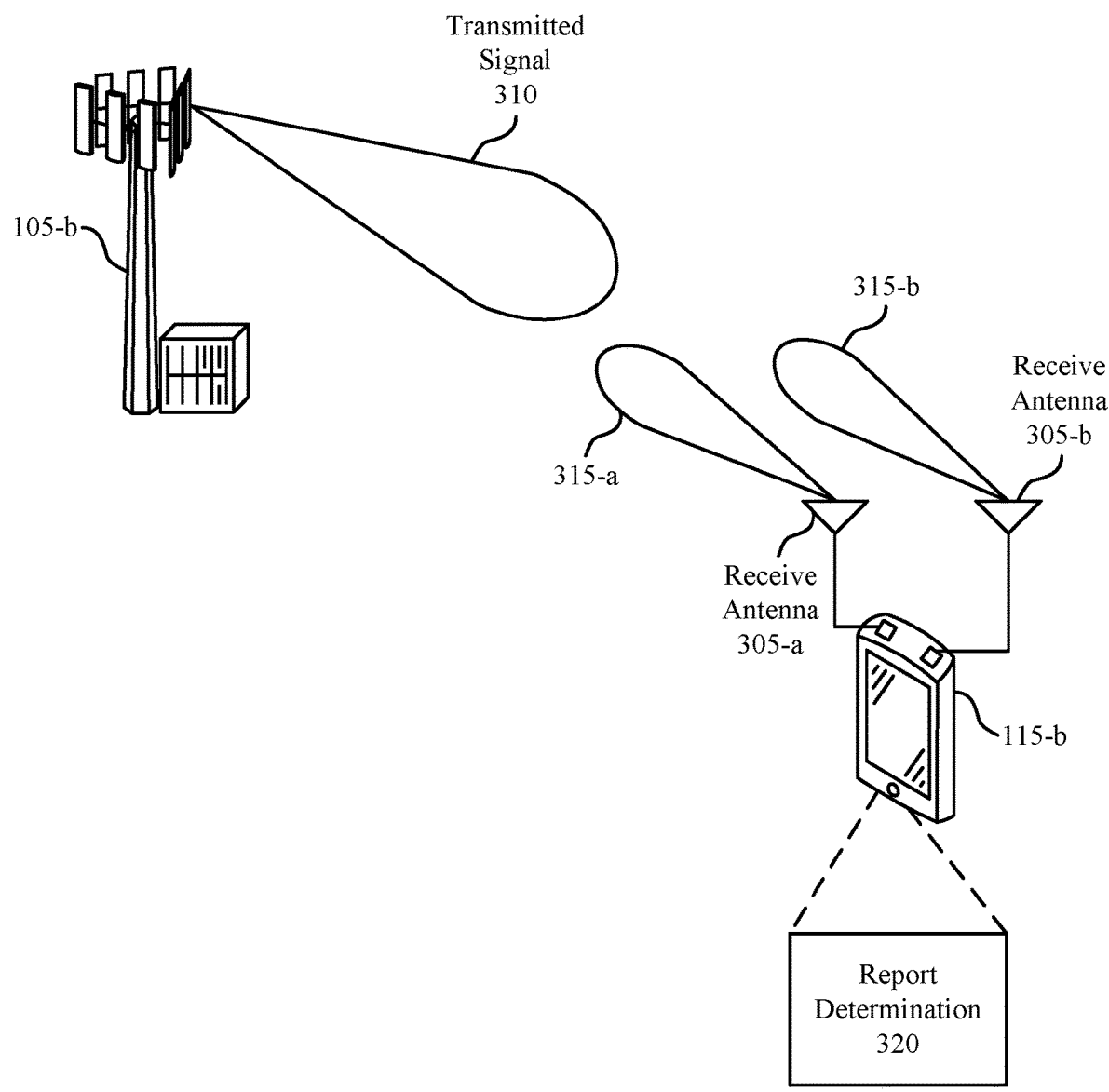
FIG. 3 illustrates an example of a multiple antenna configuration in accordance with aspects of the present disclosure.

FIG. 3 illustrates an example of a multiple antenna configuration 300 of a UE 115-b that supports time-domain waveform reporting for positioning in accordance with aspects of the present disclosure. In some examples, multiple antenna configuration 300 may implement aspects of wireless communications systems 100 and/or 200. Multiple antenna configuration 300 may include a base station 105-b and UE 115-b, which may be examples of corresponding base stations 105 and UEs 115, respectively, as described above with reference to FIGS. 1 and 2. Similar to the waveform reporting mechanism described above with reference to FIG. 2, UE 115-b may receive a request from base station 105-b to measure a transmitted signal 310 (e.g., a time domain waveform of PRSs or additional reference signals) from base station 105-b (e.g., according to a sampling rate and quantization level) and may transmit a waveform report to base station 105-b indicating the measurements (e.g., time domain samples of RSTD measurements) of transmitted signal 310.

However, in some cases, UE 115-b may include multiple receive antennas 305 (e.g., multiple antenna ports, such as virtual and/or physical antennas of UE 115-b), which may impact how UE 115-b measures and reports the measurements of transmitted signal 310. For example, UE 115-b may include a first receive antenna 305-a (e.g., a first antenna port) and a second receive antenna 305-b (e.g., a second antenna port) that receive transmitted signal 310 on a corresponding receive beam 315-a and receive beam 315-b, respectively. In some cases, the receive antennas 305 may include individual antenna ports that may represent physical (e.g., actual) antennas or virtual antennas, where the virtual antennas may be a logical representation of a receive antenna that is mapped to physical antennas of UE 115-b.

Accordingly, UE 115-b may include multiple receive antennas 305 and may measure transmitted signal 310 to report a waveform back for the measurements on one or more of the multiple receive antennas 305. In some cases, UE 115-b may report the measurement for transmitted signal 310 based on measurements from receiving the signal from one receive antenna 305 (e.g., first receive antenna 305-a). The one receive antenna 305 may be chosen based on a defined (e.g., maximum) received energy across all of the multiple receive antennas 305 of UE 115-b. Additionally, UE 115-b may report measurements from different receive antennas 305 within separate report opportunities. In some cases, base station 105-b may indicate which receive antenna 305 UE 115-b is to report the measurement within a report opportunity. Additionally or alternatively, UE 115-b may report measurements for all receive antennas 305 located in UE 115-b. As such, when UE 115-b reports the measurements for all receive antennas 305, a sampling rate may be longer and a quantization level may be lower (e.g., smaller) to offset an increased feedback associated with the higher amount of measurements reported. In some cases, UE 115-*b* may report a received waveform of each receive antenna 305 during a different time-interval. For example, measurements from a first receive antenna (Rx1) (e.g., first receive antenna 305-*a*) may be transmitted in a first symbol, measurements from a second receive antenna (Rx2) (e.g., second receive antenna 305-*b*) may be transmitted in a second symbol, etc.

Additionally or alternatively, UE 115-*b* may report measurements from a subset of receive antennas 305 (e.g., based on receiving the transmitted signal 310 across multiple receive antennas 305). For example, UE 115-*b* may report measurements from a receive antenna 305 based on a polarization characteristic of cross-poled antennas. That is, for each pair of cross-poled antennas, UE 115-*b* may report measurements for one of the receive antennas 305 and not the other. For example, first receive antenna 305-*a* and second receive antenna 305-*b* may constitute a cross-pole antenna pair, and UE 115-*b* may report the measurements of receive antenna 305-*a* and not receive antenna 305-*b* for the waveform report based on the polarization and cross-pole configuration of the two receive antennas 305.

In some cases, UE 115-*b* may report a total energy of the waveform across the multiple receive antennas 305 by summing up individual energies of transmitted signal 310 (e.g., and the received time domain waveforms at UE 115-*b*) across the multiple receive antennas 305. Since transmitted signal 310 may have a different phase offset when received at each receive antenna 305 (e.g., different received time domain waveforms at each receive antenna 305), a coherent summation may not provide useful information for the measurements of transmitted signal 310. However, the amplitudes may be similar across the receive antennas 305, so a non-coherent summation may include useful information about the strength of transmitted signal 310 across the multiple receive antennas 305.

Additionally or alternatively, UE 115-*b* may perform a compression of the amplitude (e.g., and phase) of the received signal across the receive antennas 305 (e.g., time-domain samples) and/or may report the phases of transmitted signal 310 at each receive antenna 305 independently when reporting the waveform. The compression may be a differential (e.g., delta) compression that compresses differences between each of the amplitudes (e.g., and phases) measured by each receive antenna 305. For example, UE 115-*b* may determine and transmit a report of the waveform based on receiving the transmitted signal 310 across multiple receive antennas 305, where differences in amplitudes (e.g., and phases) of receiving the transmitted signal 310 across the multiple receive antennas 305 are compressed.

In some cases, UE 115-*b* may also determine (e.g., autonomously) which time-domain sample measurements to report with the waveform(s). For example, UE 115-*b* may have the option of which time duration measured for transmitted signal 310 to report. In some cases, UE 115-*b* may use a fractional symbol reporting scheme for reporting the measurements of transmitted signal 310 with the waveform. Accordingly, the fractional reporting scheme may enable UE 115-*b* to report measurements for a time duration that spans across multiple symbols, one symbol, or a fraction of a symbol (e.g., an OFDM symbol). Additionally or alternatively, UE 115-*b* may use a time-mask with an offset and sampling rate for reporting the measurements of transmitted signal 310 with the waveform. In some cases, UE 115-*b* may report a starting point of the measurement and a sampling rate used for the measurements. Additionally or alternatively, UE 115-*b* may report multiple starting points with different durations for the respective measurements, where each measurement includes a longer period than a previous measurement duration. In some cases, base station 105-*b* may configure UE 115-*b* with one or more starting points and corresponding duration(s) for the measurements, and UE 115-*b* may select a sampling rate (and/or quantization level) for the measurements based on the starting point and duration for the respective measurements and report the selected sampling rate with the waveform.

Figure 4:
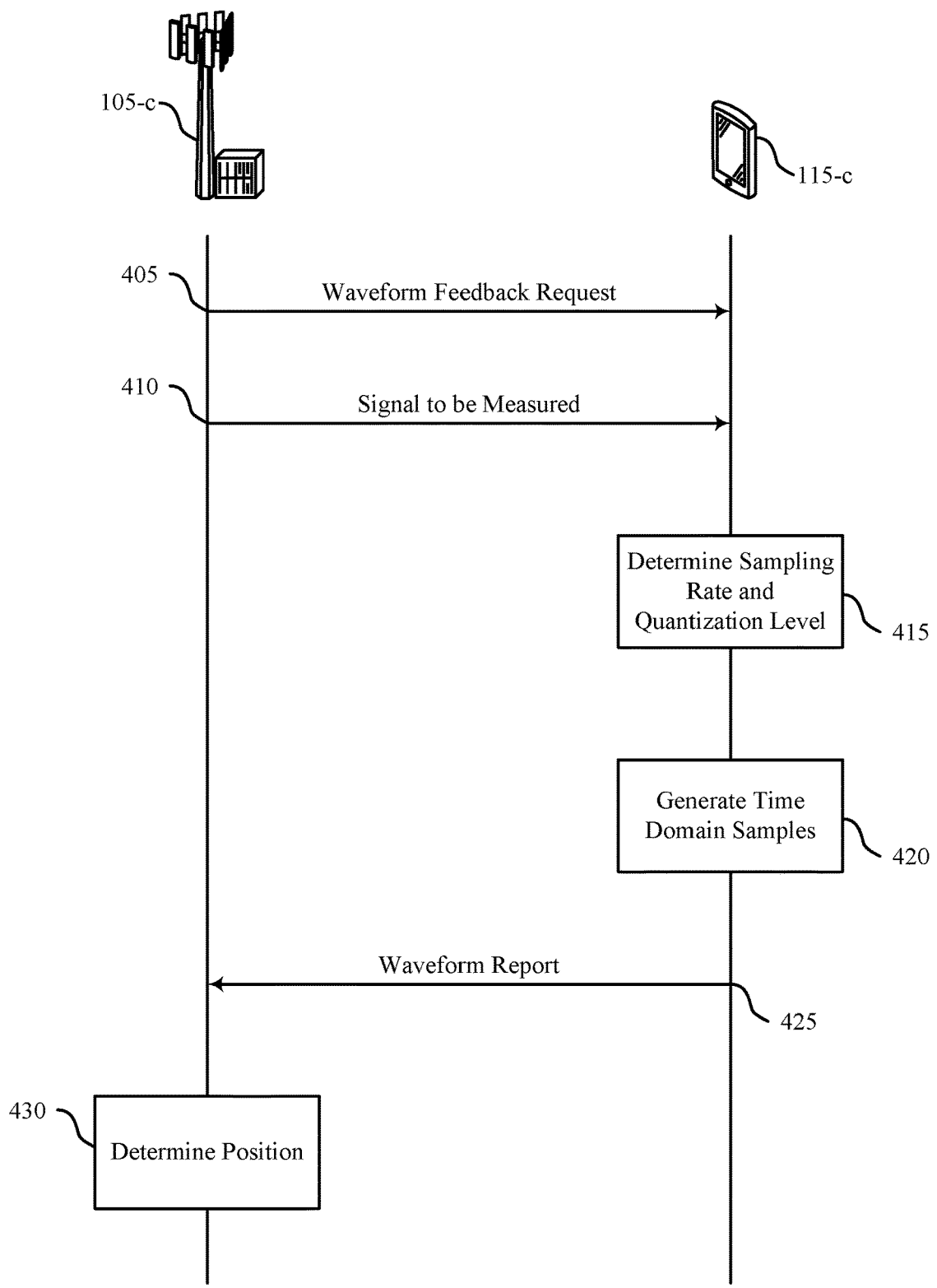
FIGS. 4 and 5 illustrate examples of process flows in accordance with aspects of the present disclosure.

FIG. 4 illustrates an example of a process flow 400 that supports time-domain waveform reporting for positioning in accordance with aspects of the present disclosure. In some examples, process flow 400 may implement aspects of wireless communications systems 100 and/or 200. Process flow 400 may include a base station 105-*c* and a UE 115-*c*, which may be examples of corresponding base stations 105 and UEs 115, respectively, as described above with reference to FIGS. 1-3.

In the following description of the process flow 400, the operations between UE 115-*c* and base station 105-*c* may be performed in different orders or at different times. Certain operations may also be left out of the process flow 400, or other operations may be added to the process flow 400. While UE 115-*c* and base station 105-*c* are shown performing a number of the operations of process flow 400, any wireless device may perform the operations shown.

At 405, UE 115-*c* may receive a waveform feedback request (e.g., from base station 105-*c*) instructing UE 115-*c* to measure a time domain waveform of a signal transmitted in a frequency resource (e.g., CC or BWP) over a measurement duration.

At 410, base station 105-*c* may transmit the signal in the frequency resource at least during the measurement duration.

At 415, UE 115-*c* may determine a sampling rate, a quantization level, or both based on a filter class of UE 115-*c*, a frequency band corresponding to the frequency resource, the measurement duration, or a combination thereof. In some cases, UE 115-*c* may determine the sampling rate, the quantization level, or both based on a bandwidth of the frequency band. Additionally or alternatively, UE 115-*c* may determine an interference level within a second frequency resource, a second frequency band, a CC, or a BWP (e.g., a maximum interference level in the second CC or second BWP, a measured interference level during a period of time prior to receiving the waveform feedback request at 405, etc.) that is adjacent to the frequency band or the frequency resource and may determine the sampling rate, the quantization level, or both based on the interference level, a distance between the second frequency band, the second frequency resource, the CC, or the BWP and the frequency band or the frequency resource or a combination thereof.

At 420, UE 115-*c* may generate time domain samples of the time domain waveform during the measurement duration based on the sampling rate, the quantization level, or both.

At 425, UE 115-*c* may transmit a waveform report (e.g., to base station 105-*c*) based on the time domain samples. In some cases, the waveform report may indicate the sampling rate, the quantization level, or both. Additionally or alternatively, the waveform report may indicate feedback generated based on time domain samples of the time domain waveform, a sampling rate of the time domain samples, a quantization level of the time domain samples, or a combination thereof.

At 430, base station 105-*c* may determine a location of UE 115-*c* based on the waveform report. In some cases, base station 105-*c* may apply digital filtering to the feedback to generate filtered feedback based on the sampling rate, the quantization level, or both and may determine the location of UE 115-*c* based on the filtered feedback.

Figure 5:
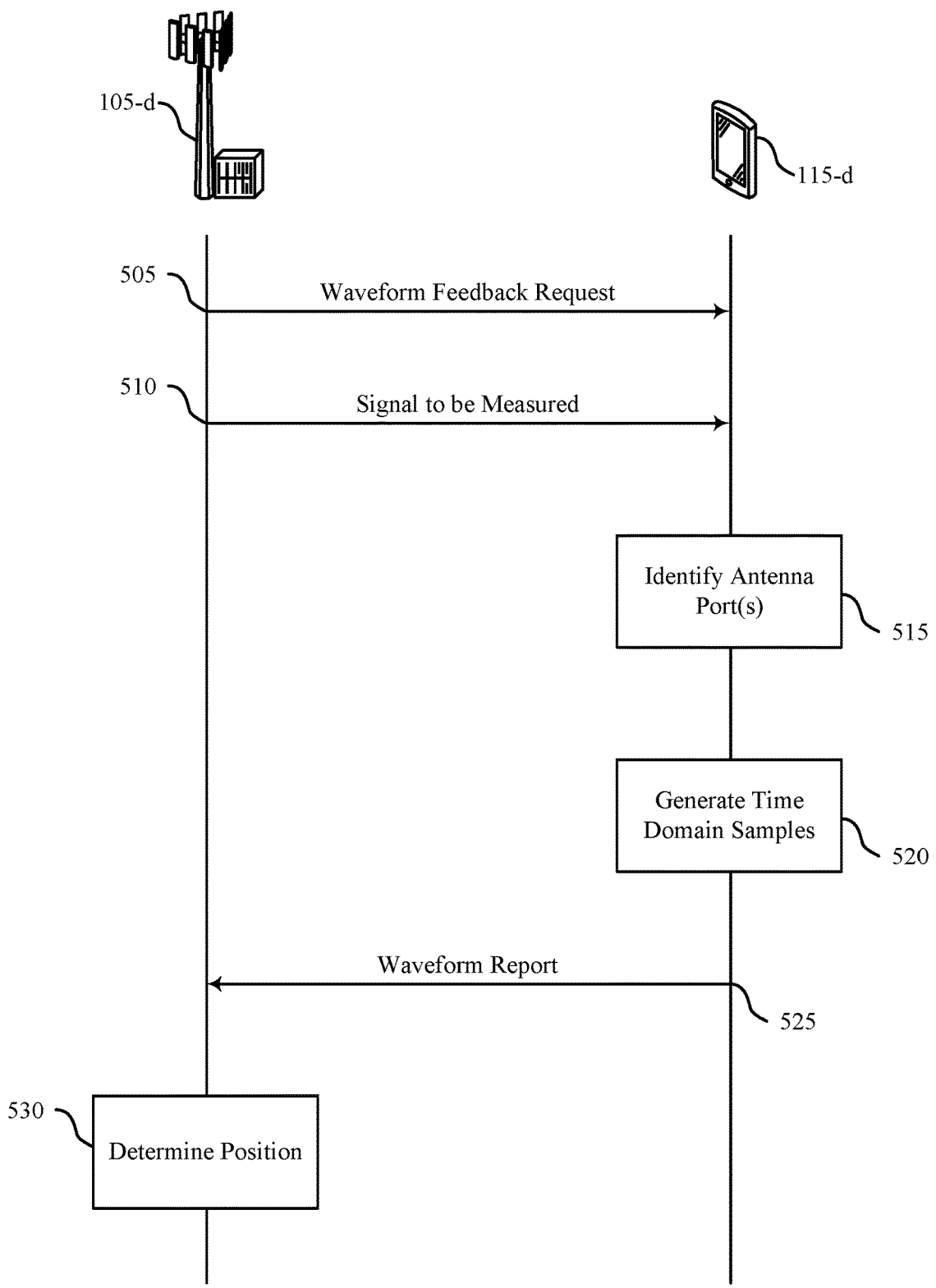

FIG. 5 illustrates an example of a process flow 500 that supports time-domain waveform reporting for positioning in accordance with aspects of the present disclosure. In some examples, process flow 500 may implement aspects of wireless communications systems 100 and/or 200. Process flow 500 may include a base station 105-*d* and a UE 115-*d*, which may be examples of corresponding base stations 105 and UEs 115, respectively, as described above with reference to FIGS. 1-4. In some cases, as described above with reference to FIG. 3, UE 115-*d* may include multiple antennas (e.g., antenna ports, such as virtual and/or physical antennas of UE 115-*d*) for receiving and/or transmitting signals to base station 105-*d*.

In the following description of the process flow 500, the operations between UE 115-*d* and base station 105-*d* may be performed in different orders or at different times. Certain operations may also be left out of the process flow 500, or other operations may be added to the process flow 500. While UE 115-*d* and base station 105-*d* are shown performing a number of the operations of process flow 500, any wireless device may perform the operations shown.

At 505, UE 115-*d* may receive a waveform feedback request (e.g., from base station 105-*d*) instructing UE 115-*d* to measure a time domain waveform of a signal. In some cases, UE 115-*d* may receive control signaling configuring UE 115-*d* with at least one measurement starting point and at least one measurement duration. Additionally or alternatively, base station 105-*d* may transmit the waveform feedback request instructing UE 115-*d* to measure the time domain waveform of the signal during a measurement duration and an indication of one or more antenna ports (e.g., virtual or physical antennas) UE 115-*d* is to use for generating time domain samples of the time domain waveform.

At 510, UE 115-*d* may transmit the signal in a frequency resource (e.g., a CC or a BWP) at least during the measurement duration.

At 515, UE 115-*d* may identify one or more antenna ports to use for measuring the time domain waveform. In some cases, UE 115-*d* may identify the one or more antenna ports based on receiving the indication from base station 105-*d* of which of the one or more antenna ports to use for generating the time domain samples at 505. Additionally or alternatively, UE 115-*d* may select a first antenna port of the multiple antenna ports on UE 115-*d* for measuring the time domain waveform. For example, UE 115-*d* may select the first antenna port based on comparing energy received at the first antenna port relative to energy received at one or more other antenna ports of the multiple antenna ports on UE 115-*d*. In some cases, UE 115-*d* may select a subset of the one or more antenna ports for measuring the time domain waveform. For example, UE 115-*d* may select the subset of the one or more antenna ports based on sets of cross-poled antenna ports within the one or more antenna ports, where one antenna port from each set of the cross-poled antenna ports is selected for the subset of the one or more antenna ports.

At 520, UE 115-*d* may generate time domain samples of the time domain waveform using the one or more antenna ports. In some cases, UE 115-*d* may generate the time domain samples of the time domain waveform using each of the one or more antenna ports, where a waveform report indicates feedback for up to all of the one or more antenna ports. Additionally or alternatively, UE 115-*d* may determine a sampling rate, a quantization level, or both based on a number of the one or more antenna ports to be used for generating the time domain samples and may generate the time domain samples based on the sampling rate, the quantization level, or both. In some cases, UE 115-*d* may generate first time domain samples of the time domain waveform using a first antenna port during a first time interval, generate second time domain samples of the time domain waveform using a second antenna port during a second time interval, and generate the waveform report based on the first and second time domain samples. Additionally or alternatively, UE 115-*d* may generate the time domain samples over a time duration that spans a fraction of a symbol, a single symbol, or multiple symbols. In some cases, UE 115-*d* may select a sampling rate based on the at least one measurement starting point and the at least one measurement duration, where the time domain samples of the time domain waveform are generated based on the sampling rate and where the waveform report indicates the sampling rate.

At 525, UE 115-*d* may transmit the waveform report to base station 105-*d* based on the time domain samples. In some cases, UE 115-*d* may cycle between each antenna port of the multiple antenna ports on UE 115-*d* for measuring the time domain waveform in a reporting opportunity and may generate the waveform report for each reporting opportunity based on the time domain samples of the time domain waveform measured by a respective one of the multiple antenna ports. Additionally or alternatively, UE 115-*d* may generate the waveform report based on a sum of energy of the time domain waveform received by a respective antenna port of the one or more antenna ports, where the sum of the energy is a non-coherent energy summation. In some cases, UE 115-*d* may generate the waveform report based on determining a compression of the time domain samples (e.g., amplitudes and/or phases of the time domain samples) of the time domain waveform measured at respective antenna ports of the one or more antenna ports. Additionally, the waveform report may indicate separate phases of the time domain samples of the time domain waveform measured at each antenna of the one or more antennas. In some cases, the compression may include a differential (e.g., delta) compression of differences between individual amplitudes, individual phases, or a combination thereof for each of the time domain samples.

Additionally or alternatively, the waveform report may indicate a time mask with offset and a sampling rate. In some cases, the waveform report may indicate a measurement starting point and a sampling rate. Additionally or alternatively, the waveform report may indicate multiple measurement starting points and a corresponding multiple measurement durations, the multiple measurement durations occurring consecutively, in disjoint durations, or a combination thereof.

At 530, base station 105-*d* may determine a location of UE 115-*d* based on the waveform report. In some cases, the waveform report may indicate feedback generated based on a sampling rate and may determine the location of UE 115-*d* based on the sampling rate. Additionally or alternatively, base station 105-*d* may apply digital filtering to the feedback to generate filtered feedback based on the sampling rate and may determine the location of UE 115-*d* based on the filtered feedback.

Figure 6:
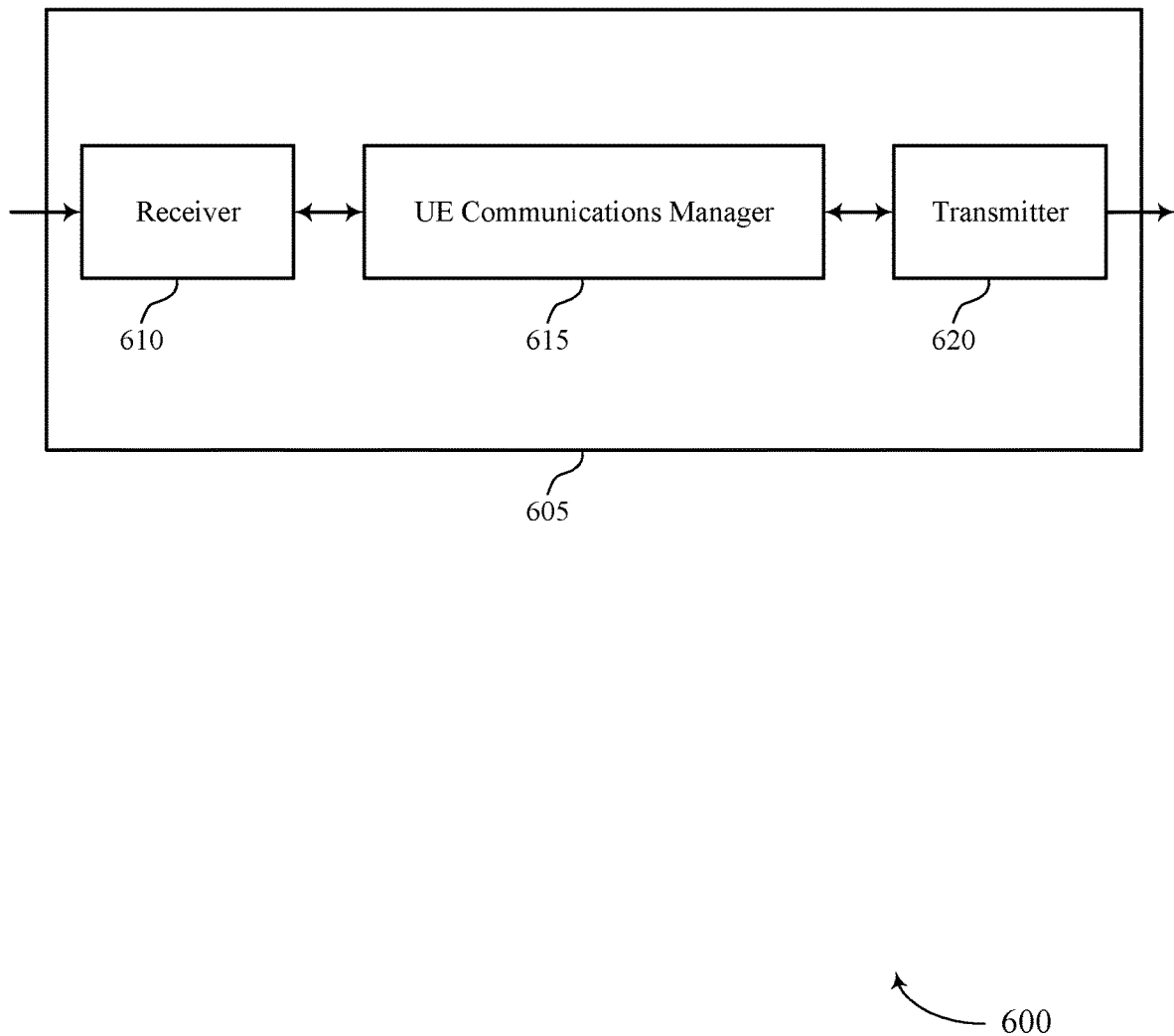
FIGS. 6 and 7 show block diagrams of devices in accordance with aspects of the present disclosure.

FIG. 6 shows a block diagram 600 of a device 605 that supports time-domain waveform reporting for positioning in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to time-domain waveform reporting for positioning, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive a waveform feedback request (e.g., from a base station) instructing the UE to measure a time domain waveform of a signal transmitted in a frequency resource (e.g., a CC or a BWP) over a measurement duration. In some cases, the UE communications manager 615 may determine a sampling rate, a quantization level, or both based on a filter class of the UE, a frequency band corresponding to the frequency resource, the measurement duration, a bandwidth of the frequency band, or a combination thereof. Additionally, the UE communications manager 615 may generate time domain samples of the time domain waveform during the measurement duration based on the sampling rate, the quantization level, or both. Subsequently, the UE communications manager 615 may transmit a waveform report (e.g., to the base station) based on the time domain samples.

Additionally or alternatively, the UE communications manager 615 may receive a waveform feedback request (e.g., from a base station) instructing the UE to measure a time domain waveform of a signal. In some cases, the UE communications manager 615 may identify one or more antenna ports of the UE to use for measuring the time domain waveform. Additionally, the UE communications manager 615 may generate time domain samples of the time domain waveform using the one or more antenna ports. Subsequently, the UE communications manager 615 may transmit a waveform report (e.g., to the base station) based on the time domain samples. The UE communications manager 615 may be an example of aspects of the UE communications manager 910 described herein.

In some examples, the UE communications manager 615 as described herein may be implemented to realize one or more potential advantages for a UE 115. For example, based on generating time domain samples of a time domain waveform (e.g., using one or more antenna ports in some implementations), the UE communications manager 615 may enable the UE 115 to transmit a waveform report even when there is interference from adjacent frequency resources than the frequency resource used to receive and measure the waveform. As such, the UE 115 may provide a more accurate waveform report to enable a base station 105 to make adjustments for subsequent communications, thereby saving signaling overhead for the UE 115.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
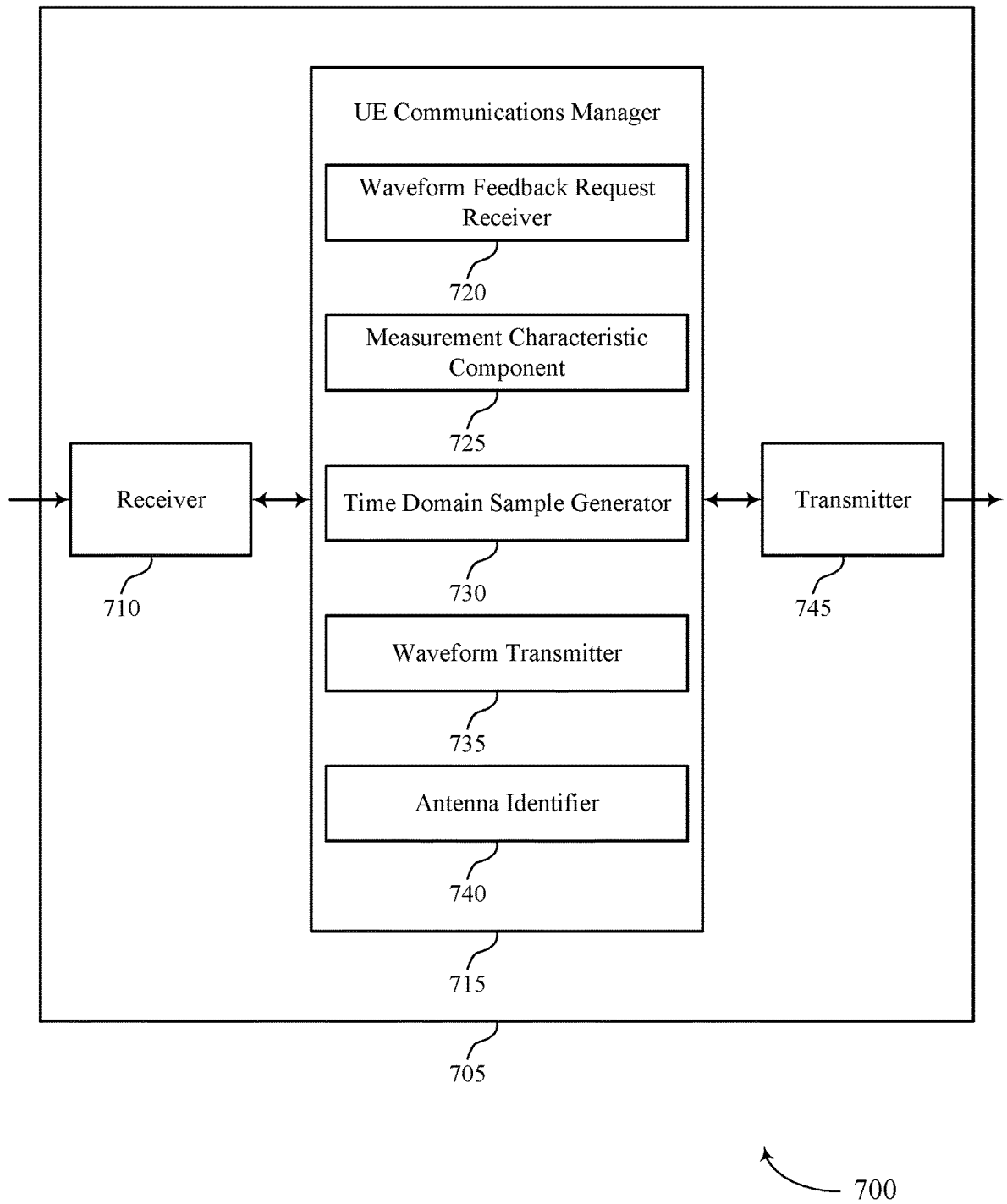

FIG. 7 shows a block diagram 700 of a device 705 that supports time-domain waveform reporting for positioning in accordance with aspects of the present disclosure. The device 705 may be an example of aspects of a device 605, or a UE 115 as described herein. The device 705 may include a receiver 710, a UE communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to time-domain waveform reporting for positioning, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a waveform feedback request receiver 720, a measurement characteristic component 725, a time domain sample generator 730, a waveform transmitter 735, and an antenna identifier 740. The UE communications manager 715 may be an example of aspects of the UE communications manager 910 described herein.

The waveform feedback request receiver 720 may receive a waveform feedback request (e.g., from a base station) instructing the UE to measure a time domain waveform of a signal transmitted in a frequency resource (e.g., a CC or a BWP) over a measurement duration. Additionally or alternatively, the waveform feedback request receiver 720 may receive a waveform feedback request (e.g., from a base station) instructing the UE to measure a time domain waveform of a signal.

The measurement characteristic component 725 may determine a sampling rate, a quantization level, or both based on a filter class of the UE, a frequency band corresponding to the frequency resource, the measurement duration, a bandwidth of the frequency band, or a combination thereof.

The antenna identifier 740 may identify one or more antenna ports of the UE to use for measuring the time domain waveform.

The time domain sample generator 730 may generate time domain samples of the time domain waveform during the measurement duration based on the sampling rate, the quantization level, or both. Additionally or alternatively, the time domain sample generator 730 may generate time domain samples of the time domain waveform using the one or more antenna ports.

The waveform transmitter 735 may transmit a waveform report (e.g., to the base station) based on the time domain samples.

Based on techniques for generating time domain samples of a time domain waveform using a sampling rate and/or a quantization level, a processor of a UE 115 (e.g., controlling the receiver 710, the transmitter 745, or the transceiver 920 as described with reference to FIG. 9) may decrease latency and signaling overhead that would result from generating less accurate time domain samples of the time domain waveform and transmitting those less accurate samples to a base station 105. For example, based on the generated time domain samples (e.g., more accurate measurements), the base station 105 may make better adjustments for subsequent communications with the UE 115, and, as such, the processor of the UE 115 may provide more efficient communications for the UE 115 through less signaling overhead and latency from determining multiple time domain samples and measurements.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
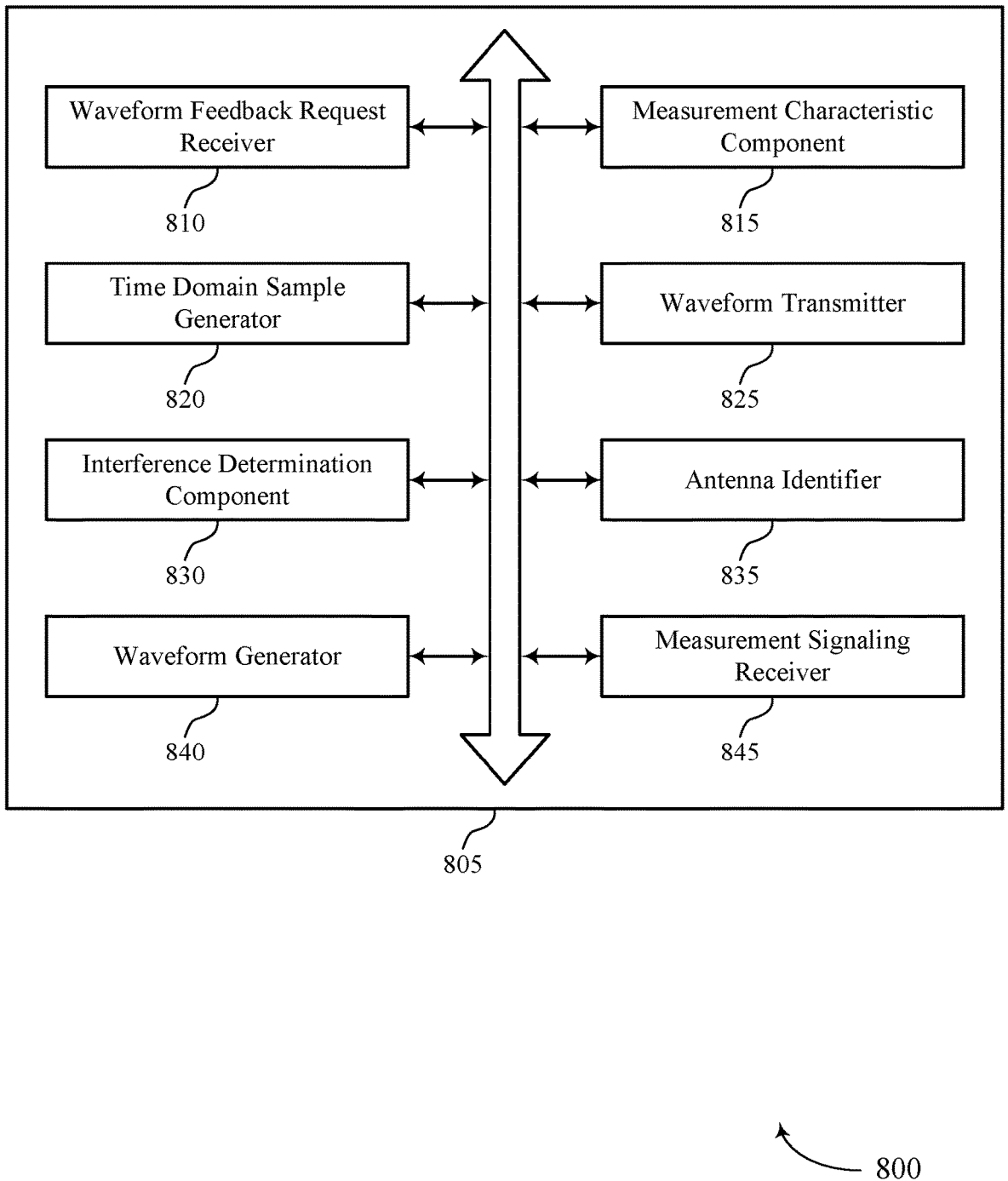
FIG. 8 shows a block diagram of a user equipment (UE) communications manager in accordance with aspects of the present disclosure.

FIG. 8 shows a block diagram 800 of a UE communications manager 805 that supports time-domain waveform reporting for positioning in accordance with aspects of the present disclosure. The UE communications manager 805 may be an example of aspects of a UE communications manager 615, a UE communications manager 715, or a UE communications manager 910 described herein. The UE communications manager 805 may include a waveform feedback request receiver 810, a measurement characteristic component 815, a time domain sample generator 820, a waveform transmitter 825, an interference determination component 830, an antenna identifier 835, a waveform generator 840, and a measurement signaling receiver 845. Each of these modules may communicate, directly or indirectly, with one another (e.g., via one or more buses). Additionally, these different modules of the UE communications manager 805 may provide various means for accomplishing the described techniques herein.

The waveform feedback request receiver 810 may receive a waveform feedback request (e.g., from a base station) instructing the UE to measure a time domain waveform of a signal transmitted in a frequency resource (e.g., a CC or a BWP) over a measurement duration. In some examples, the waveform feedback request receiver 810 may receive a waveform feedback request (e.g., from a base station) instructing the UE to measure a time domain waveform of a signal.

The measurement characteristic component 815 may determine a sampling rate, a quantization level, or both based on a filter class of the UE, a frequency band corresponding to the frequency resource, the measurement duration, or a combination thereof. In some examples, the measurement characteristic component 815 may determine the sampling rate, the quantization level, or both based on a bandwidth of the frequency band.

The time domain sample generator 820 may generate time domain samples of the time domain waveform during the measurement duration based on the sampling rate, the quantization level, or both. In some examples, the time domain sample generator 820 may generate time domain samples of the time domain waveform using the one or more antenna ports. In some examples, the time domain sample generator 820 may determine a sampling rate, a quantization level, or both based on a number of the one or more antenna ports to be used for generating the time domain samples. In some examples, the time domain sample generator 820 may generate the time domain samples based on the sampling rate, the quantization level, or both. In some examples, the time domain sample generator 820 may generate the time domain samples over a time duration that spans a fraction of a symbol, a single symbol, or a set of symbols.

The waveform transmitter 825 may transmit a waveform report (e.g., to the base station) based on the time domain samples. In some cases, the waveform report may indicate the sampling rate, the quantization level, or both. In some cases, the waveform report may indicate a time mask with offset and a sampling rate. In some cases, the waveform report may indicate a measurement starting point and a sampling rate. In some cases, the waveform report may indicate a set of measurement starting points and a corresponding set of measurement durations, the set of measurement durations occurring consecutively, in disjoint durations, or a combination thereof.

The antenna identifier 835 may identify one or more antenna ports (e.g., virtual and/or physical antennas) of the UE to use for measuring the time domain waveform. In some examples, the antenna identifier 835 may select a first antenna port of a set of antenna ports for measuring the time domain waveform. In some examples, the antenna identifier 835 may select the first antenna port based on comparing energy received at the first antenna port relative to energy received at one or more other antenna ports of the set of antenna ports. In some examples, the antenna identifier 835 may receive an indication from the base station of which of the one or more antenna ports of the UE to use for generating the time domain samples. In some examples, the antenna identifier 835 may generate the time domain samples of the time domain waveform using each of the one or more antenna ports, where the waveform report indicates feedback for up to all of the one or more antenna ports. In some examples, the antenna identifier 835 may select a subset of the one or more antenna ports for measuring the time domain waveform. In some examples, the antenna identifier 835 may select the subset of the one or more antenna ports based on sets of cross-poled antenna ports within the one or more antenna ports, where one antenna port from each set of the cross-poled antenna ports is selected for the subset of the one or more antenna ports.

The interference determination component 830 may determine an interference level within a second frequency band that is adjacent to the frequency band. In some examples, the interference determination component 830 may determine the sampling rate, the quantization level or both based on the interference level, a distance between the second frequency band and the frequency band, or a combination thereof. In some examples, the interference determination component 830 may determine an interference level within a CC that is adjacent to the frequency resource.

In some examples, the interference determination component 830 may determine the sampling rate, the quantization level, or both based on the interference level, a distance between the CC and the frequency resource, or a combination thereof. In some examples, the interference determination component 830 may determine an interference level within a BWP that is adjacent to the frequency resource. In some examples, the interference determination component 830 may determine the sampling rate, the quantization level, or both based on the interference level, a distance between the BWP and the frequency resource, or a combination thereof.

The waveform generator 840 may cycle between each antenna port of the set of antenna ports for measuring the time domain waveform in a reporting opportunity. In some examples, the waveform generator 840 may generate the waveform report for each reporting opportunity based on the time domain samples of the time domain waveform measured by a respective one of the set of antenna ports. In some examples, the waveform generator 840 may generate first time domain samples of the time domain waveform using a first antenna port during a first time interval, may generate second time domain samples of the time domain waveform using a second antenna port during a second time interval, and may generate the waveform report based on the first and second time domain samples. In some examples, the waveform generator 840 may generate the waveform report based on a sum of energy of the time domain waveform received by a respective antenna port of the one or more antenna ports. In some examples, the waveform generator 840 may generate the waveform report based on determining a compression of the time domain samples of the time domain waveform measured at respective antenna ports of the one or more antenna ports. In some cases, the sum of the energy may be a non-coherent energy summation. In some cases, the compression may include a differential compression of differences between individual amplitudes, individual phases, or a combination thereof for each of the time domain samples. In some cases, the waveform report may indicate separate phases of the time domain samples of the time domain waveform measured at each antenna of the one or more antennas.

The measurement signaling receiver 845 may receive control signaling configuring the UE with at least one measurement starting point and at least one measurement duration. In some examples, the measurement signaling receiver 845 may select a sampling rate based on the at least one measurement starting point and the at least one measurement duration, where the time domain samples of the time domain waveform are generated based on the sampling rate, and where the waveform report indicates the sampling rate.

Figure 9:
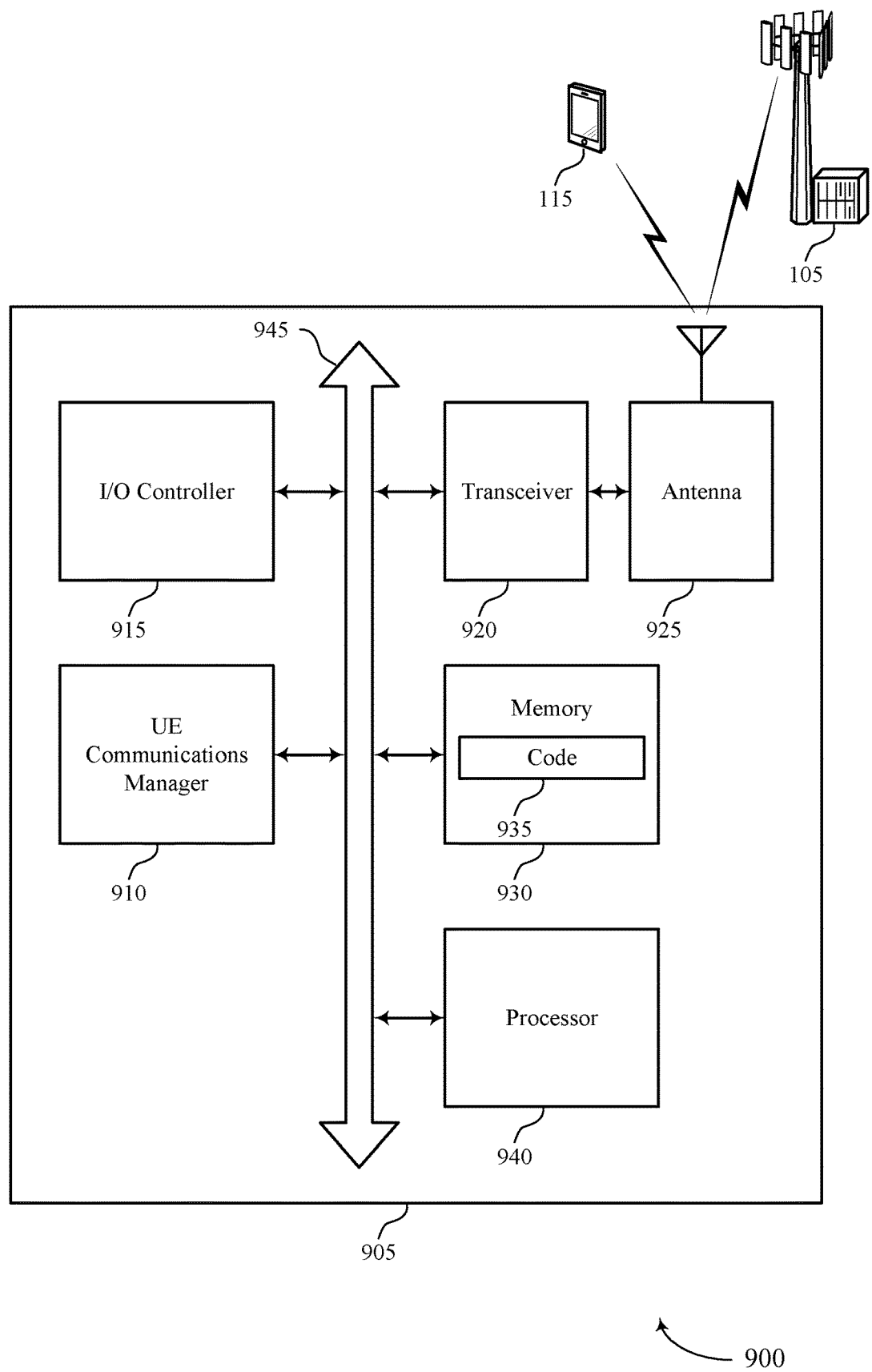
FIG. 9 shows a diagram of a system including a device in accordance with aspects of the present disclosure.

FIG. 9 shows a diagram of a system 900 including a device 905 that supports time-domain waveform reporting for positioning in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive a waveform feedback request (e.g., from a base station) instructing the UE to measure a time domain waveform of a signal transmitted in a frequency resource (e.g., a CC or a BWP) over a measurement duration. In some cases, The UE communications manager 910 may determine a sampling rate, a quantization level, or both based on a filter class of the UE, a frequency band corresponding to the frequency resource, a bandwidth of the frequency band, the measurement duration, or a combination thereof. Additionally, the UE communications manager 910 may generate time domain samples of the time domain waveform during the measurement duration based on the sampling rate, the quantization level, or both. Subsequently, the UE communications manager 910 may transmit a waveform report (e.g., to the base station) based on the time domain samples.

Additionally or alternatively, the UE communications manager 910 may also receive a waveform feedback request (e.g., from a base station) instructing the UE to measure a time domain waveform of a signal. In some cases, the UE communications manager 910 may identify one or more antenna ports of the UE to use for measuring the time domain waveform. Additionally, the UE communications manager 910 may generate time domain samples of the time domain waveform using the one or more antenna ports. Subsequently, the UE communications manager 910 may transmit a waveform report (e.g., to the base station) based on the time domain samples.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting time-domain waveform reporting for positioning).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
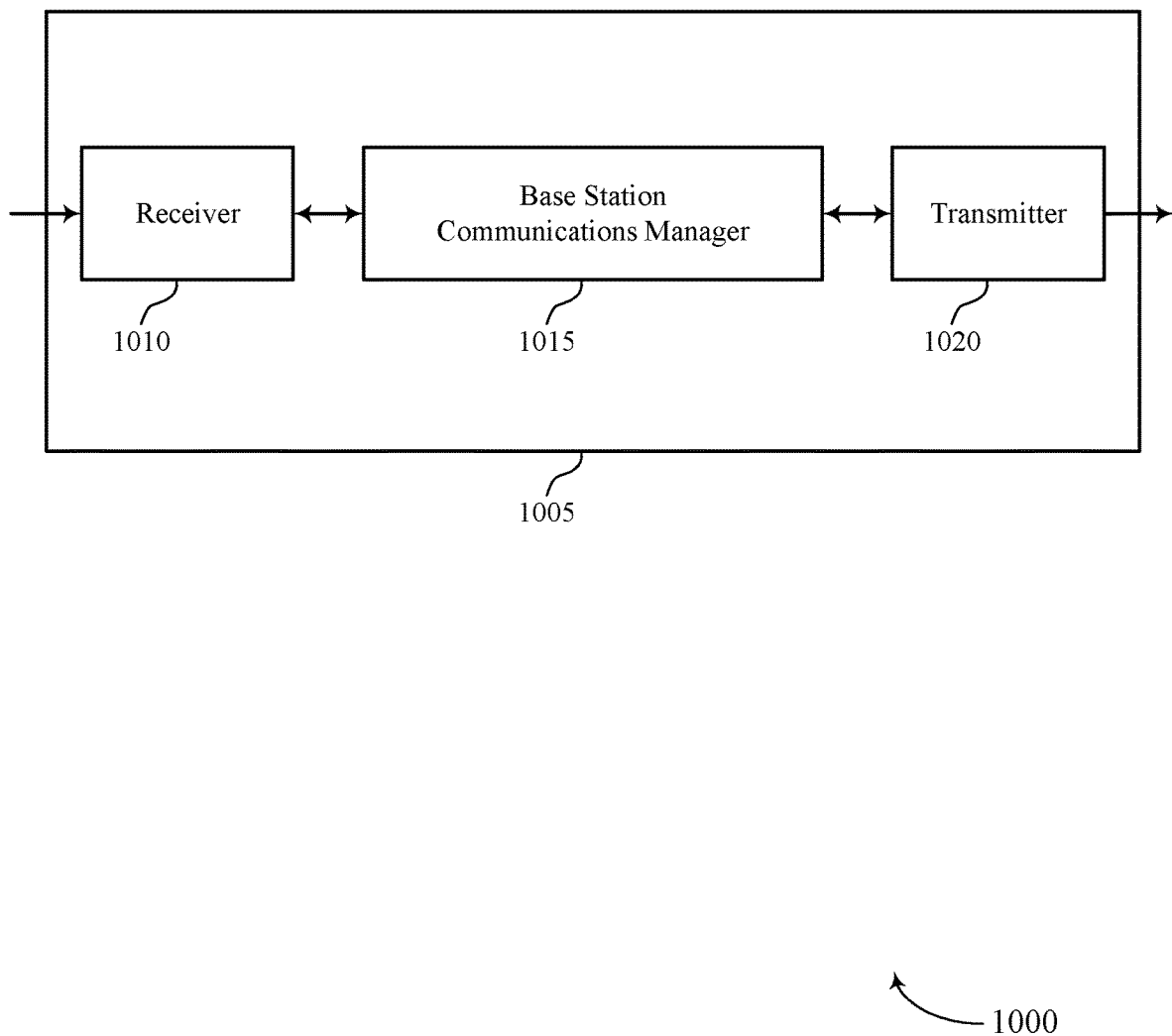
FIGS. 10 and 11 show block diagrams of devices in accordance with aspects of the present disclosure.

FIG. 10 shows a block diagram 1000 of a device 1005 that supports time-domain waveform reporting for positioning in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to time-domain waveform reporting for positioning, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit a waveform feedback request instructing a UE to measure a time domain waveform of a signal transmitted in a frequency resource (e.g., a CC or a BWP) over a measurement duration. Additionally, the base station communications manager 1015 may transmit the signal in the frequency resource at least during the measurement duration. In some cases, the base station communications manager 1015 may receive a waveform report from the UE.

Additionally or alternatively, the base station communications manager 1015 may transmit a waveform feedback request instructing a UE to measure a time domain waveform of a signal during a measurement duration and an indication of one or more antenna ports the UE is to use for generating time domain samples of the time domain waveform. Additionally, the base station communications manager 1015 may transmit the signal in a frequency resource (e.g., a CC or a BWP) at least during the measurement duration. In some cases, the base station communications manager 1015 may receive a waveform report from the UE generated based on time domain samples of the time domain waveform. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
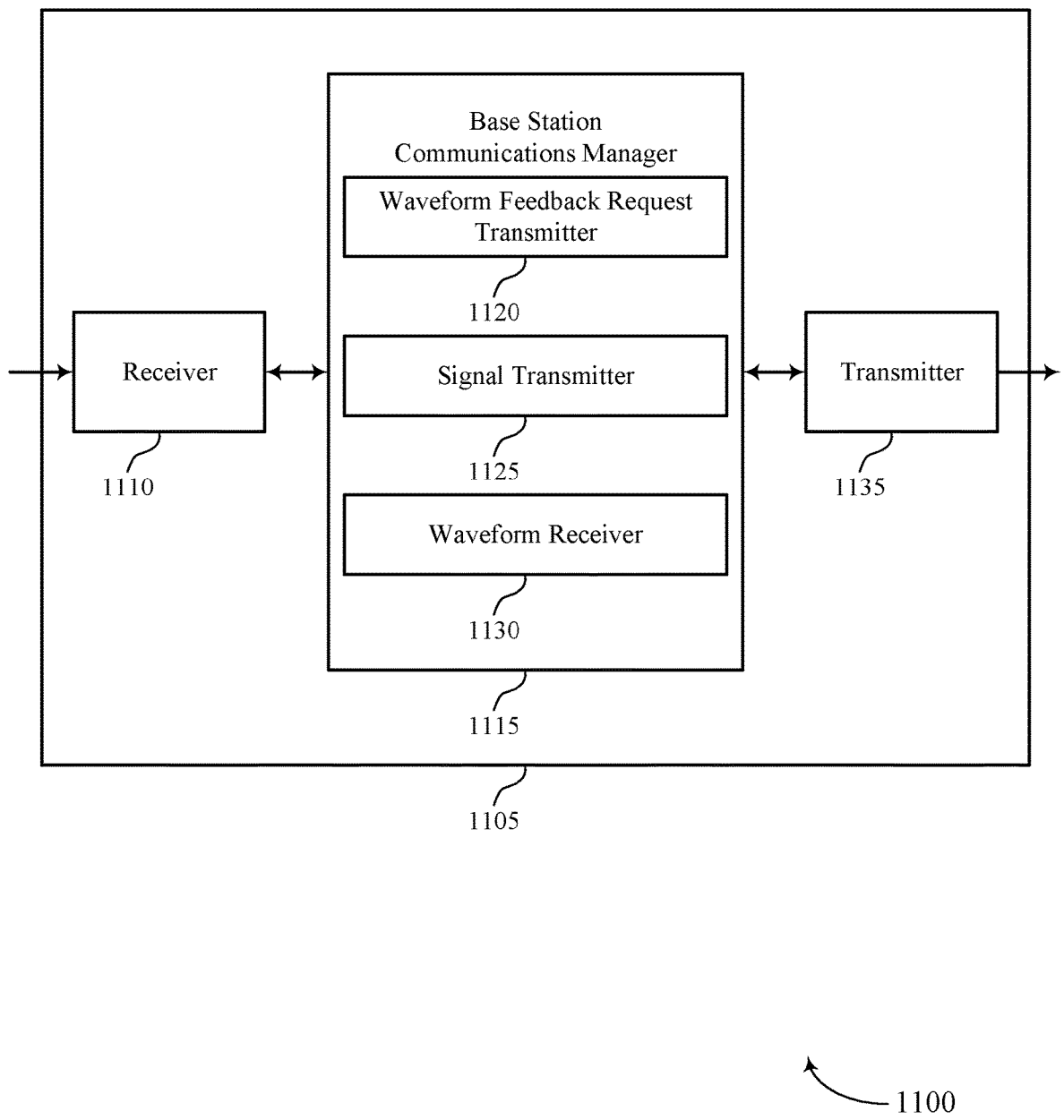

FIG. 11 shows a block diagram 1100 of a device 1105 that supports time-domain waveform reporting for positioning in accordance with aspects of the present disclosure. The device 1105 may be an example of aspects of a device 1005, or a base station 105 as described herein. The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to time-domain waveform reporting for positioning, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a waveform feedback request transmitter 1120, a signal transmitter 1125, and a waveform receiver 1130. The base station communications manager 1115 may be an example of aspects of the base station communications manager 1310 described herein.

The waveform feedback request transmitter 1120 may transmit a waveform feedback request instructing a UE to measure a time domain waveform of a signal transmitted in a frequency resource (e.g., a CC or a BWP) over a measurement duration. In some cases, the waveform feedback request transmitter 1120 may transmit a waveform feedback request instructing a UE to measure a time domain waveform of a signal during a measurement duration and an indication of one or more antenna ports the UE is to use for generating time domain samples of the time domain waveform.

The signal transmitter 1125 may transmit the signal in the frequency resource at least during the measurement duration.

The waveform receiver 1130 may receive a waveform report from the UE. In some cases, the waveform receiver 1130 may receive a waveform report from the UE generated based on time domain samples of the time domain waveform.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
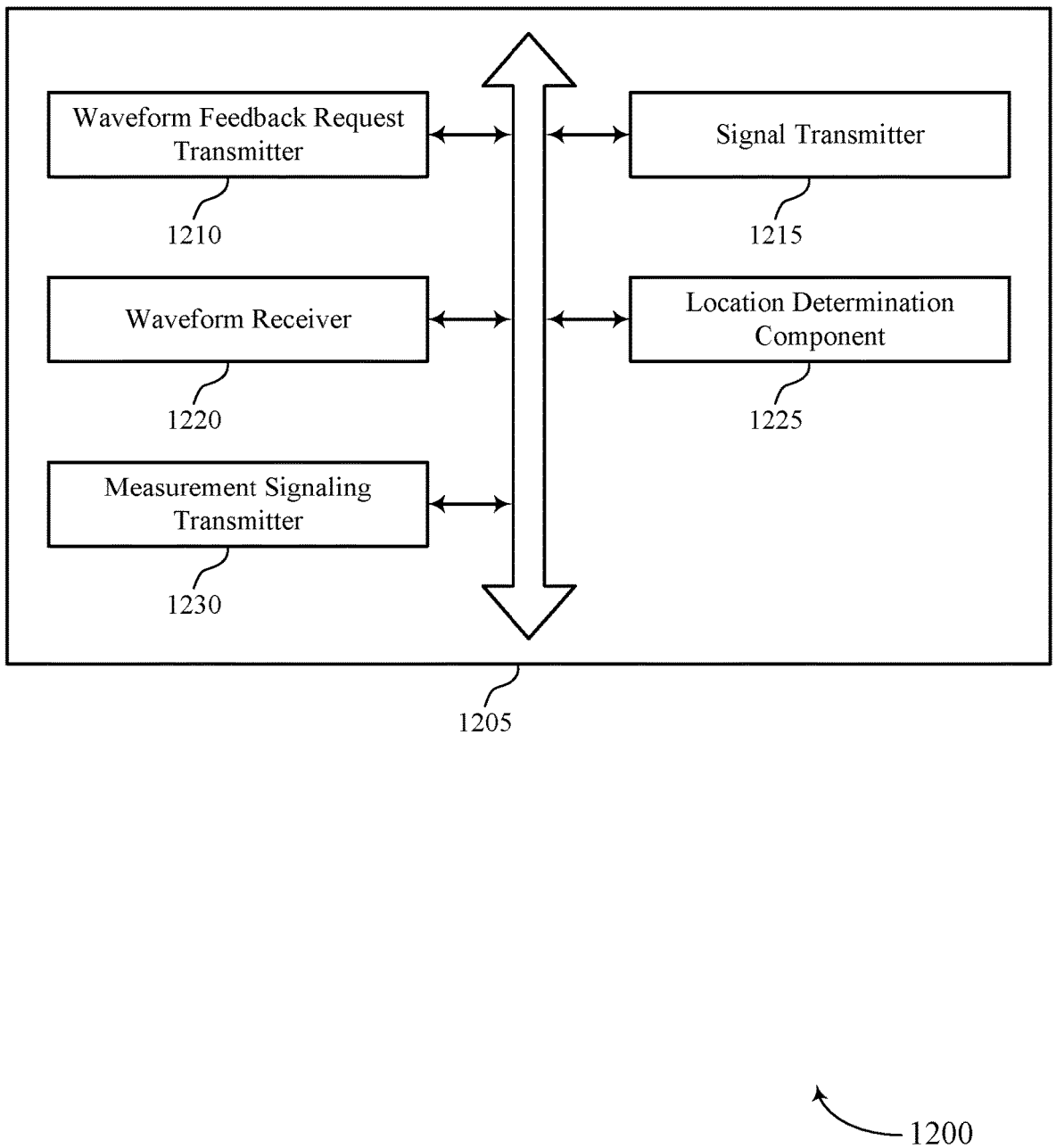
FIG. 12 shows a block diagram of a base station communications manager in accordance with aspects of the present disclosure.

FIG. 12 shows a block diagram 1200 of a base station communications manager 1205 that supports time-domain waveform reporting for positioning in accordance with aspects of the present disclosure. The base station communications manager 1205 may be an example of aspects of a base station communications manager 1015, a base station communications manager 1115, or a base station communications manager 1310 described herein. The base station communications manager 1205 may include a waveform feedback request transmitter 1210, a signal transmitter 1215, a waveform receiver 1220, a location determination component 1225, and a measurement signaling transmitter 1230. Each of these modules may communicate, directly or indirectly, with one another (e.g., via one or more buses). Additionally, these different modules of the base station communications manager 1205 may provide various means for accomplishing the described techniques herein.

The waveform feedback request transmitter 1210 may transmit a waveform feedback request instructing a UE to measure a time domain waveform of a signal transmitted in a frequency resource (e.g., a CC or a BWP) over a measurement duration. In some examples, the waveform feedback request transmitter 1210 may transmit a waveform feedback request instructing a UE to measure a time domain waveform of a signal during a measurement duration and an indication of one or more antenna ports the UE is to use for generating time domain samples of the time domain waveform.

The signal transmitter 1215 may transmit the signal in the frequency resource at least during the measurement duration.

The waveform receiver 1220 may receive a waveform report from the UE. In some examples, the waveform receiver 1220 may receive a waveform report from the UE generated based on time domain samples of the time domain waveform. In some examples, the waveform receiver 1220 may apply digital filtering to the feedback to generate filtered feedback based on the sampling rate, the quantization level, or both. In some examples, the waveform receiver 1220 may determine a location of the UE based on the filtered feedback.

In some cases, the waveform report may indicate feedback generated based on time domain samples of the time domain waveform, a sampling rate of the time domain samples, a quantization level of the time domain samples, or a combination thereof. In some cases, the waveform report may indicate a time mask with offset and a sampling rate. In some cases, the waveform report may indicate a measurement starting point and a sampling rate. In some cases, the waveform report may indicate a set of measurement starting points and a corresponding set of measurement durations, the set of measurement durations occurring consecutively, in disjoint durations, or a combination thereof.

The location determination component 1225 may determine a location of the UE based on the waveform report. In some examples, the location determination component 1225 may determine a location of the UE based on the sampling rate. In some cases, the waveform report indicates feedback generated based on a sampling rate, and the location determination component 1225 may apply digital filtering to the feedback to generate filtered feedback based on the sampling rate. In some examples, the location determination component 1225 may determine a location of the UE based on the filtered feedback.

The measurement signaling transmitter 1230 may transmit control signaling configuring the UE with at least one measurement starting point and at least one measurement point.

Figure 13:
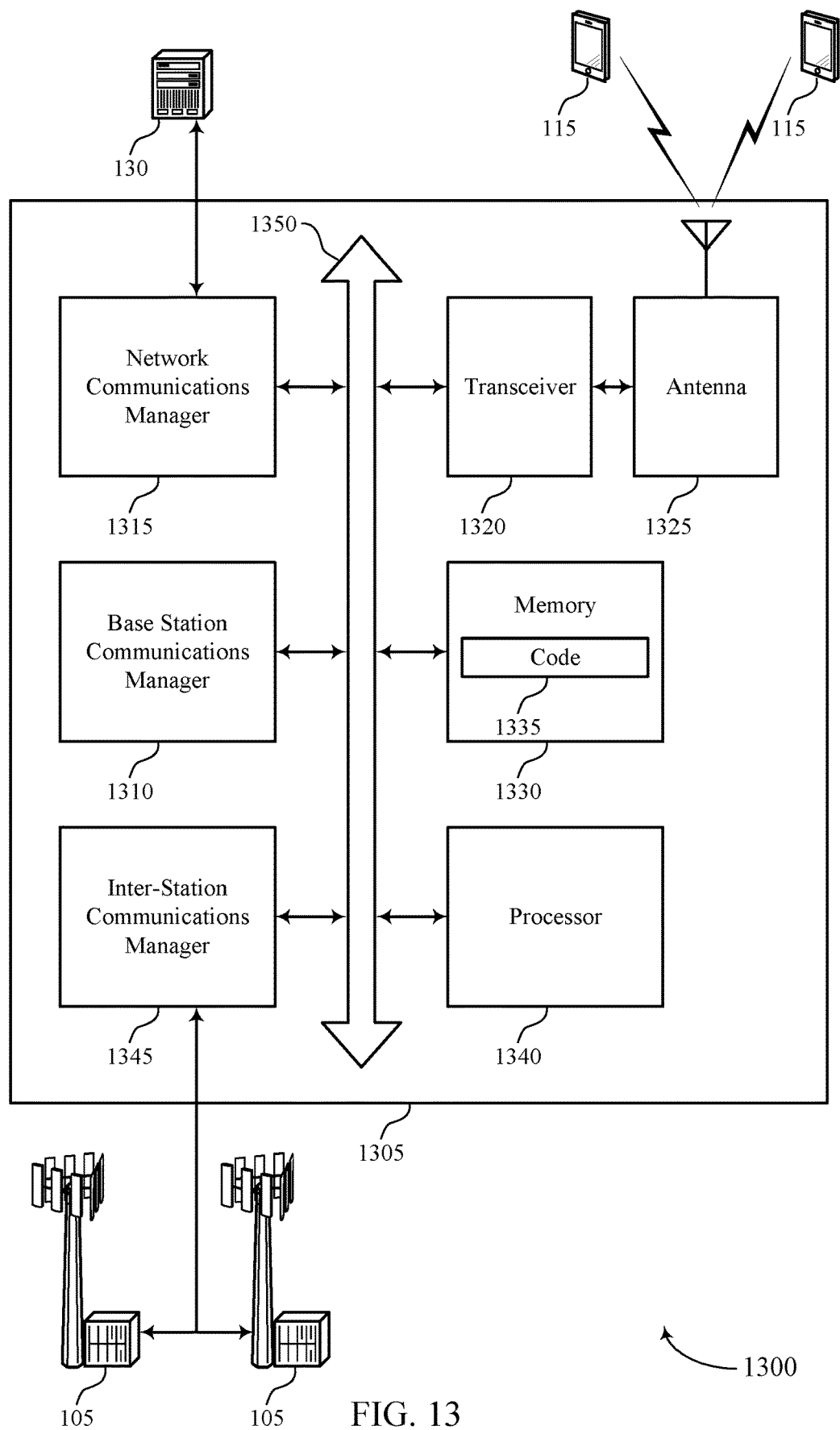
FIG. 13 shows a diagram of a system including a device in accordance with aspects of the present disclosure.

FIG. 13 shows a diagram of a system 1300 including a device 1305 that supports time-domain waveform reporting for positioning in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit a waveform feedback request instructing a UE to measure a time domain waveform of a signal transmitted in a frequency resource (e.g., a CC or a BWP) over a measurement duration. Additionally, the base station communications manager 1310 may transmit the signal in the frequency resource at least during the measurement duration. In some cases, the base station communications manager 1310 may receive a waveform report from the UE.

Additionally or alternatively, the base station communications manager 1310 may also transmit a waveform feedback request instructing a UE to measure a time domain waveform of a signal during a measurement duration and an indication of one or more antenna ports the UE is to use for generating time domain samples of the time domain waveform. Additionally, the base station communications manager 1310 may transmit the signal in a frequency resource (e.g., a CC or a BWP) at least during the measurement duration. In some cases, the base station communications manager 1310 may receive a waveform report from the UE generated based on time domain samples of the time domain waveform.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting time-domain waveform reporting for positioning).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
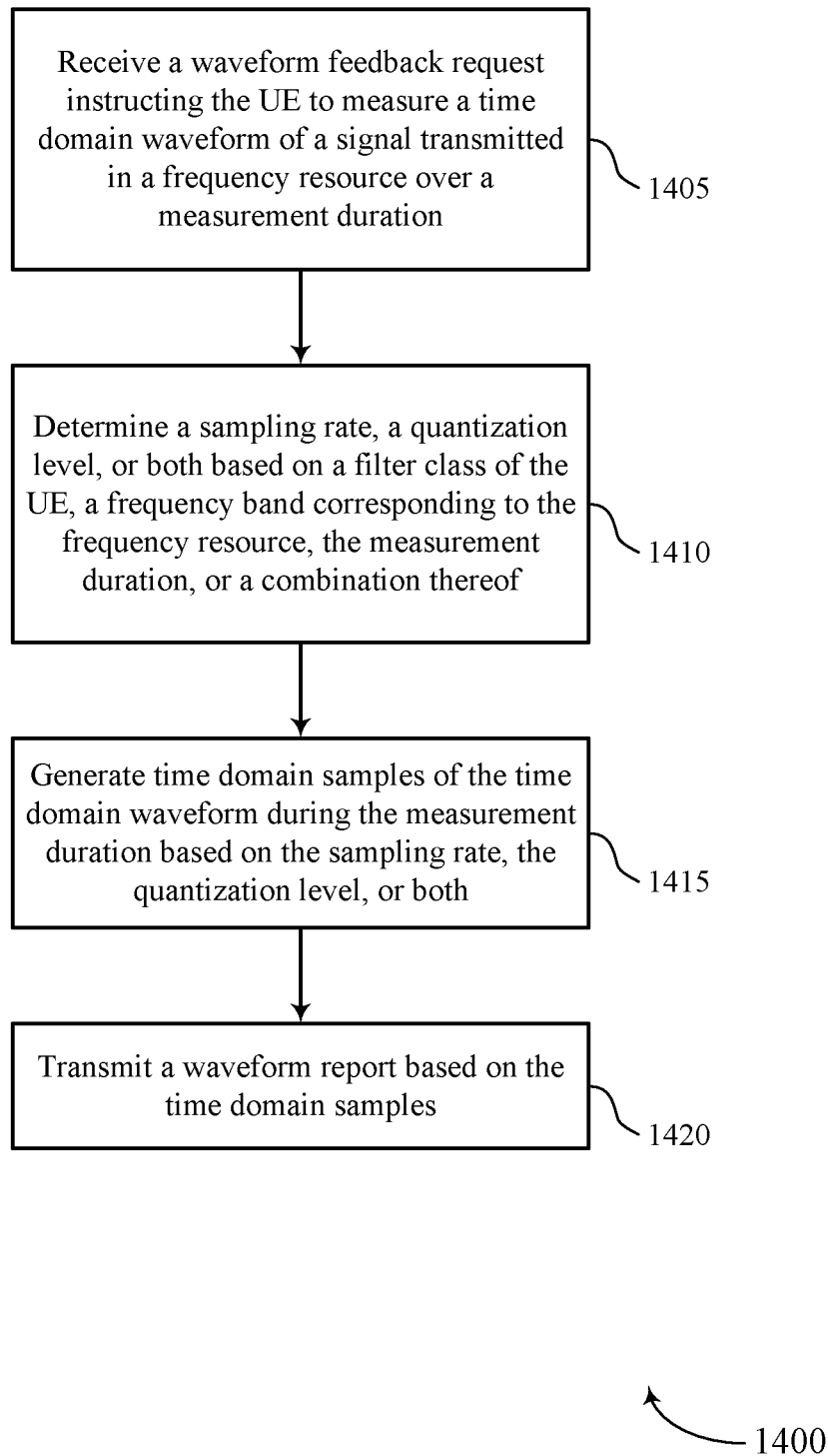
FIGS. 14 through 19 show flowcharts illustrating methods in accordance with aspects of the present disclosure.

FIG. 14 shows a flowchart illustrating a method 1400 that supports time-domain waveform reporting for positioning in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a waveform feedback request instructing the UE to measure a time domain waveform of a signal transmitted in a frequency resource over a measurement duration. The operations of 1405 may be performed according to the methods described herein. In some examples, aspects of the operations of 1405 may be performed by a waveform feedback request receiver as described with reference to FIGS. 6 through 9.

At 1410, the UE may determine a sampling rate, a quantization level, or both based on a filter class of the UE, a frequency band corresponding to the frequency resource, the measurement duration, or a combination thereof. The operations of 1410 may be performed according to the methods described herein. In some examples, aspects of the operations of 1410 may be performed by a measurement characteristic component as described with reference to FIGS. 6 through 9.

At 1415, the UE may generate time domain samples of the time domain waveform during the measurement duration based on the sampling rate, the quantization level, or both. The operations of 1415 may be performed according to the methods described herein. In some examples, aspects of the operations of 1415 may be performed by a time domain sample generator as described with reference to FIGS. 6 through 9.

At 1420, the UE may transmit a waveform report based on the time domain samples. The operations of 1420 may be performed according to the methods described herein. In some examples, aspects of the operations of 1420 may be performed by a waveform transmitter as described with reference to FIGS. 6 through 9.

Figure 15:
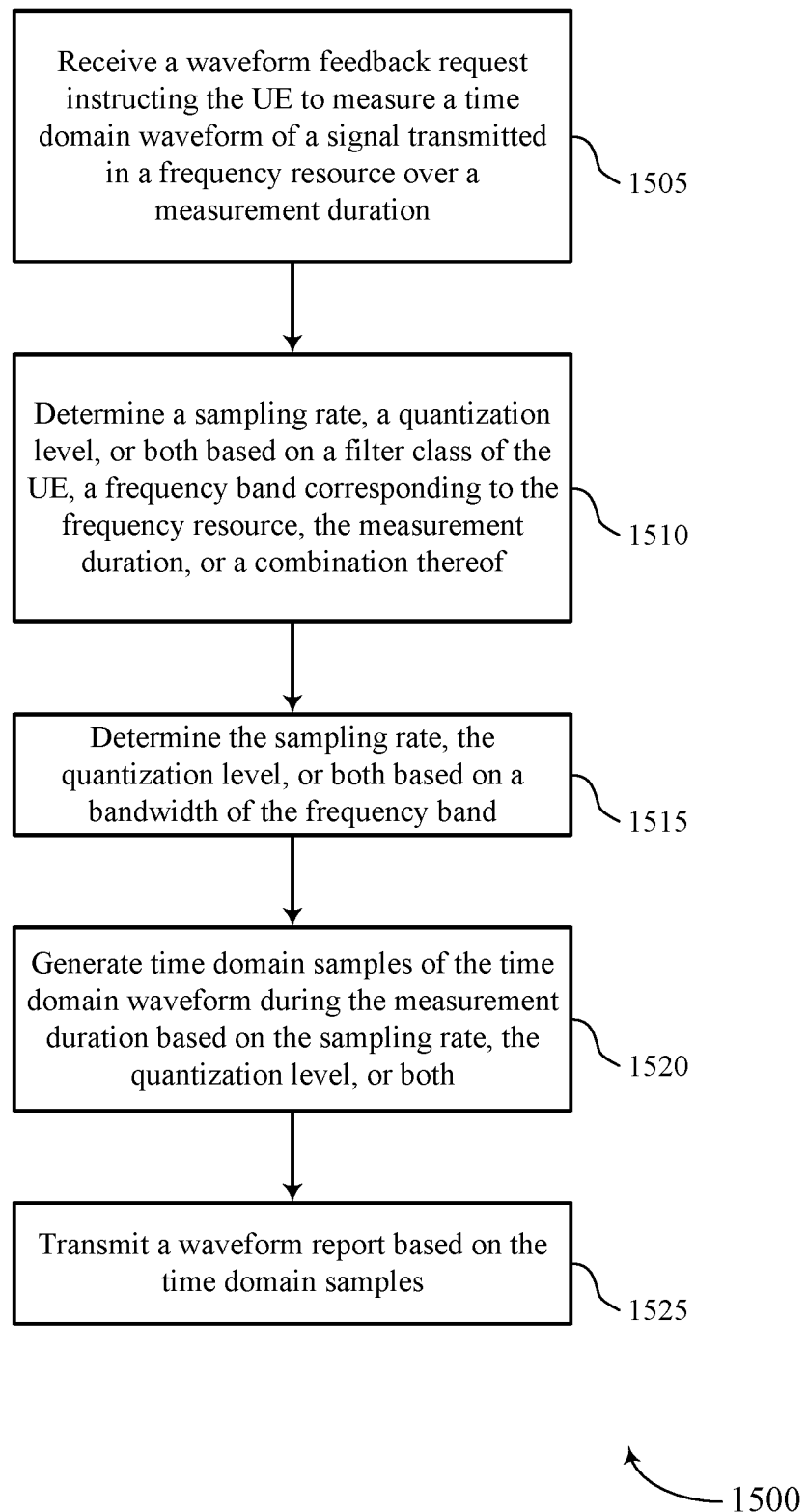

FIG. 15 shows a flowchart illustrating a method 1500 that supports time-domain waveform reporting for positioning in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a waveform feedback request instructing the UE to measure a time domain waveform of a signal transmitted in a frequency resource over a measurement duration. The operations of 1505 may be performed according to the methods described herein. In some examples, aspects of the operations of 1505 may be performed by a waveform feedback request receiver as described with reference to FIGS. 6 through 9.

At 1510, the UE may determine a sampling rate, a quantization level, or both based on a filter class of the UE, a frequency band corresponding to the frequency resource, the measurement duration, or a combination thereof. The operations of 1510 may be performed according to the methods described herein. In some examples, aspects of the operations of 1510 may be performed by a measurement characteristic component as described with reference to FIGS. 6 through 9.

At 1515, the UE may determine the sampling rate, the quantization level, or both based on a bandwidth of the frequency band. The operations of 1515 may be performed according to the methods described herein. In some examples, aspects of the operations of 1515 may be performed by a measurement characteristic component as described with reference to FIGS. 6 through 9.

At 1520, the UE may generate time domain samples of the time domain waveform during the measurement duration based on the sampling rate, the quantization level, or both. The operations of 1520 may be performed according to the methods described herein. In some examples, aspects of the operations of 1520 may be performed by a time domain sample generator as described with reference to FIGS. 6 through 9.

At 1525, the UE may transmit a waveform report based on the time domain samples. The operations of 1525 may be performed according to the methods described herein. In some examples, aspects of the operations of 1525 may be performed by a waveform transmitter as described with reference to FIGS. 6 through 9.

Figure 16:
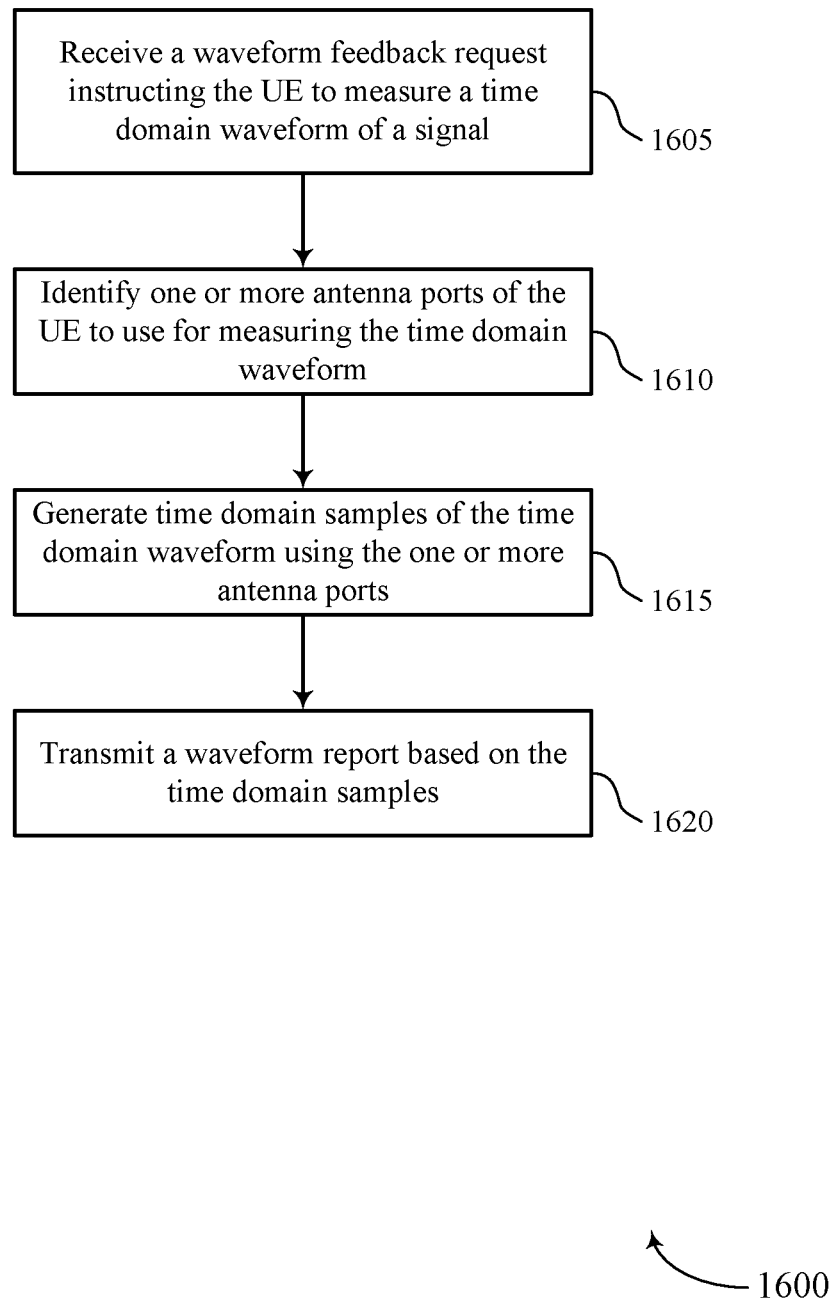

FIG. 16 shows a flowchart illustrating a method 1600 that supports time-domain waveform reporting for positioning in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a waveform feedback request instructing the UE to measure a time domain waveform of a signal. The operations of 1605 may be performed according to the methods described herein. In some examples, aspects of the operations of 1605 may be performed by a waveform feedback request receiver as described with reference to FIGS. 6 through 9.

At 1610, the UE may identify one or more antenna ports of the UE to use for measuring the time domain waveform. The operations of 1610 may be performed according to the methods described herein. In some examples, aspects of the operations of 1610 may be performed by an antenna identifier as described with reference to FIGS. 6 through 9.

At 1615, the UE may generate time domain samples of the time domain waveform using the one or more antenna ports. The operations of 1615 may be performed according to the methods described herein. In some examples, aspects of the operations of 1615 may be performed by a time domain sample generator as described with reference to FIGS. 6 through 9.

At 1620, the UE may transmit a waveform report based on the time domain samples. The operations of 1620 may be performed according to the methods described herein. In some examples, aspects of the operations of 1620 may be performed by a waveform transmitter as described with reference to FIGS. 6 through 9.

Figure 17:
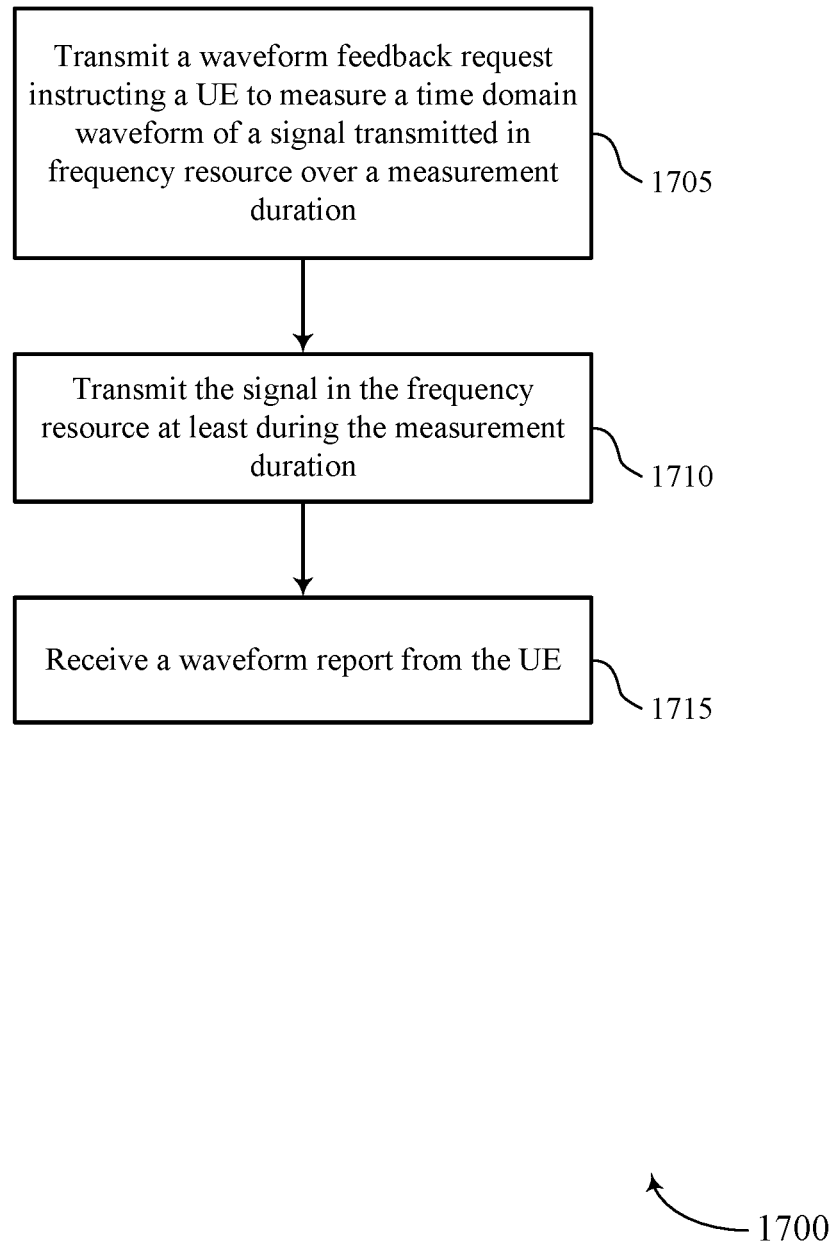

FIG. 17 shows a flowchart illustrating a method 1700 that supports time-domain waveform reporting for positioning in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a waveform feedback request instructing a UE to measure a time domain waveform of a signal transmitted in a frequency resource over a measurement duration. The operations of 1705 may be performed according to the methods described herein. In some examples, aspects of the operations of 1705 may be performed by a waveform feedback request transmitter as described with reference to FIGS. 10 through 13.

At 1710, the base station may transmit the signal in the frequency resource at least during the measurement duration. The operations of 1710 may be performed according to the methods described herein. In some examples, aspects of the operations of 1710 may be performed by a signal transmitter as described with reference to FIGS. 10 through 13.

At 1715, the base station may receive a waveform report from the UE. The operations of 1715 may be performed according to the methods described herein. In some examples, aspects of the operations of 1715 may be performed by a waveform receiver as described with reference to FIGS. 10 through 13.

Figure 18:
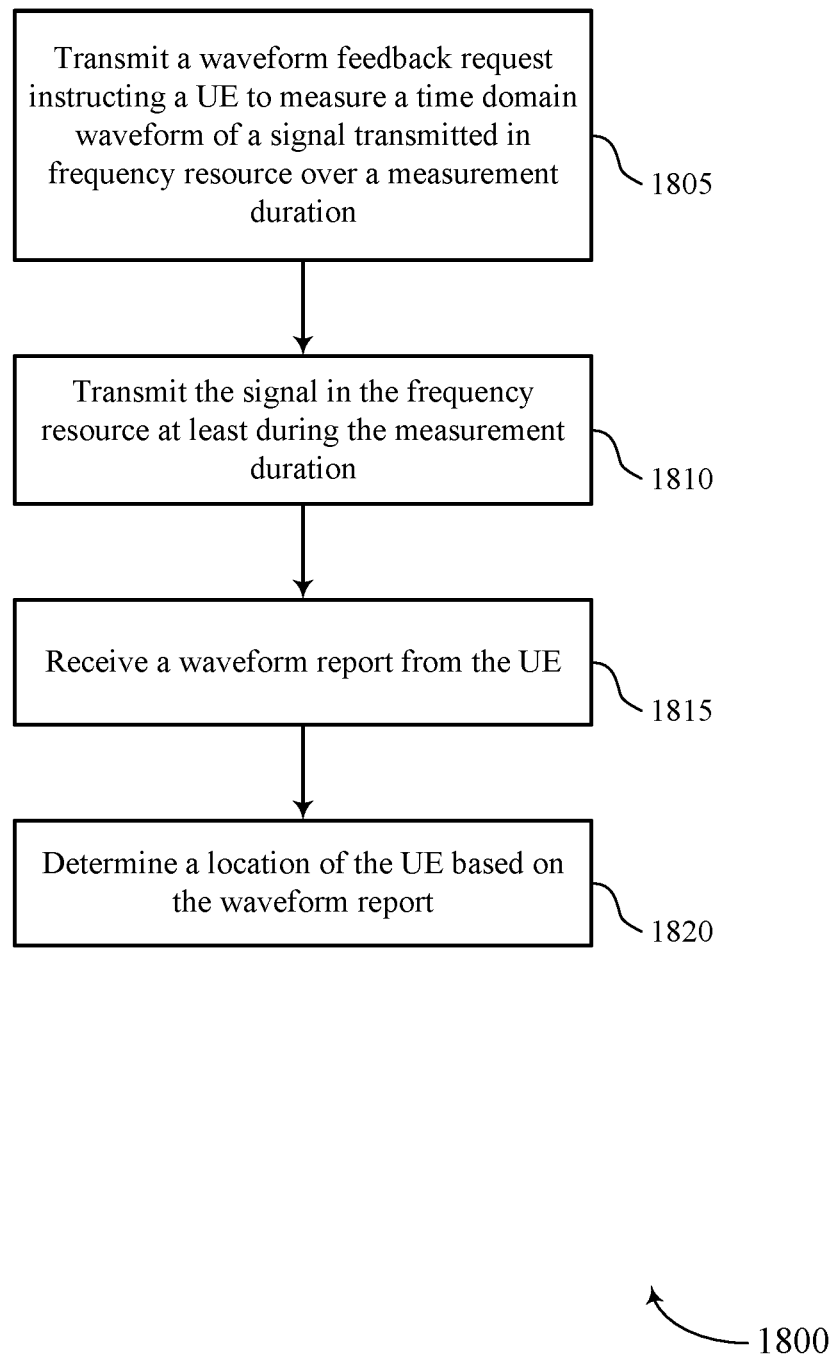

FIG. 18 shows a flowchart illustrating a method 1800 that supports time-domain waveform reporting for positioning in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a waveform feedback request instructing a UE to measure a time domain waveform of a signal transmitted in a frequency resource over a measurement duration. The operations of 1805 may be performed according to the methods described herein. In some examples, aspects of the operations of 1805 may be performed by a waveform feedback request transmitter as described with reference to FIGS. 10 through 13.

At 1810, the base station may transmit the signal in the frequency resource at least during the measurement duration. The operations of 1810 may be performed according to the methods described herein. In some examples, aspects of the operations of 1810 may be performed by a signal transmitter as described with reference to FIGS. 10 through 13.

At 1815, the base station may receive a waveform report from the UE. The operations of 1815 may be performed according to the methods described herein. In some examples, aspects of the operations of 1815 may be performed by a waveform receiver as described with reference to FIGS. 10 through 13.

At 1820, the base station may determine a location of the UE based on the waveform report. The operations of 1820 may be performed according to the methods described herein. In some examples, aspects of the operations of 1820 may be performed by a location determination component as described with reference to FIGS. 10 through 13.

Figure 19:
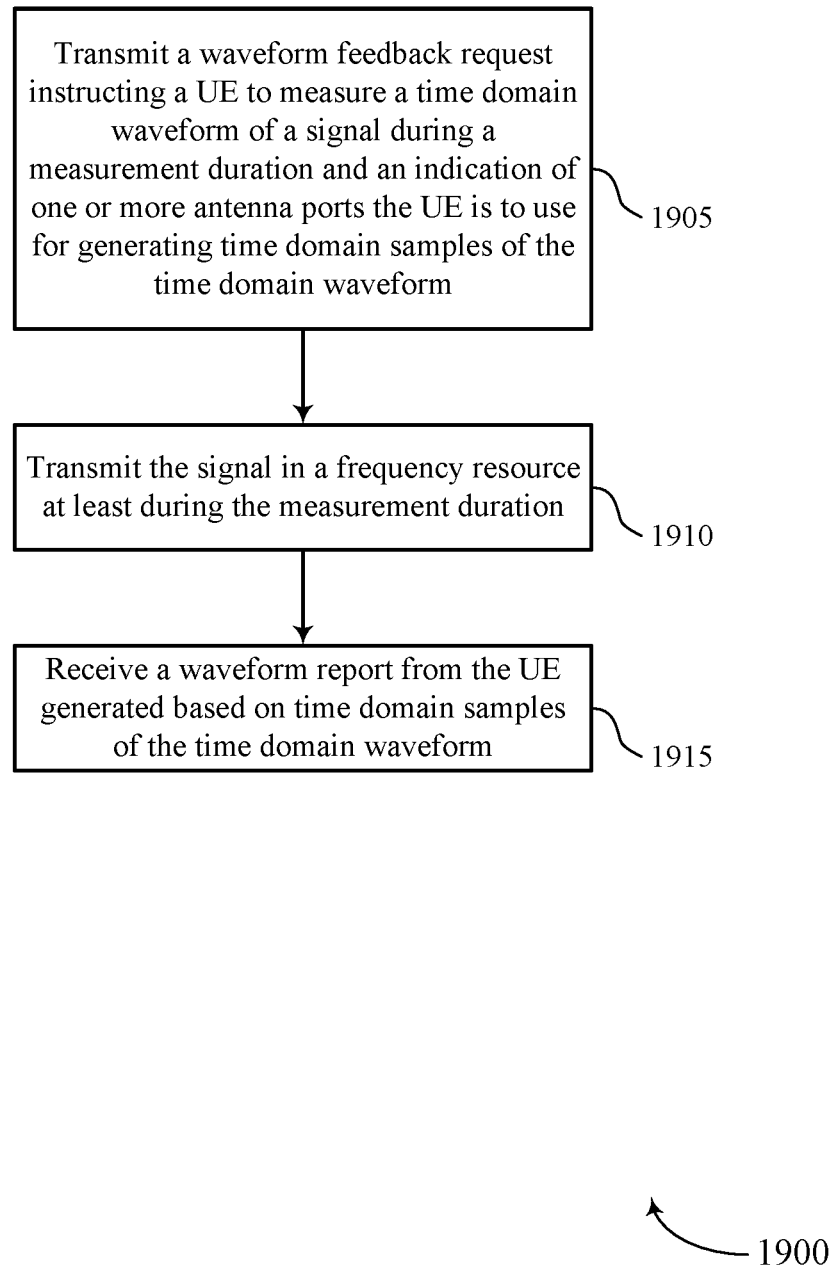

FIG. 19 shows a flowchart illustrating a method 1900 that supports time-domain waveform reporting for positioning in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit a waveform feedback request instructing a UE to measure a time domain waveform of a signal during a measurement duration and an indication of one or more antenna ports the UE is to use for generating time domain samples of the time domain waveform. The operations of 1905 may be performed according to the methods described herein. In some examples, aspects of the operations of 1905 may be performed by a waveform feedback request transmitter as described with reference to FIGS. 10 through 13.

At 1910, the base station may transmit the signal in a frequency resource at least during the measurement duration. The operations of 1910 may be performed according to the methods described herein. In some examples, aspects of the operations of 1910 may be performed by a signal transmitter as described with reference to FIGS. 10 through 13.

At 1915, the base station may receive a waveform report from the UE generated based on time domain samples of the time domain waveform. The operations of 1915 may be performed according to the methods described herein. In some examples, aspects of the operations of 1915 may be performed by a waveform receiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Example 1

A method for wireless communications by a user equipment (UE), comprising: receiving a waveform feedback request instructing the UE to measure a time domain waveform of a signal transmitted in a frequency resource over a measurement duration; determining a sampling rate, a quantization level, or both based at least in part on a filter class of the UE, a frequency band corresponding to the frequency resource, a bandwidth of the frequency band, the measurement duration, or a combination thereof; generating time domain samples of the time domain waveform during the measurement duration based at least in part on the sampling rate, the quantization level, or both; and transmitting a waveform report based at least in part on the time domain samples.

Example 2

The method of example 1, wherein determining the sampling rate, the quantization level, or both comprises: determining an interference level within a second frequency band that is adjacent to the frequency band; and determining the sampling rate, the quantization level, or both based at least in part on the interference level, a distance between the second frequency band and the frequency band, or a combination thereof.

Example 3

The method of example 1, wherein determining the sampling rate, the quantization level, or both comprises: determining an interference level within a component carrier that is adjacent to the frequency resource; and determining the sampling rate, the quantization level, or both based at least in part on the interference level, a distance between the component carrier and the frequency resource, or a combination thereof.

Example 4

The method of example 1, wherein determining the sampling rate, the quantization level, or both comprises: determining an interference level within a bandwidth part that is adjacent to the frequency resource; and determining the sampling rate, the quantization level, or both based at least in part on the interference level, a distance between the bandwidth part and the frequency resource, or a combination thereof.

Example 5

The method of any of examples 1 to 4, wherein the waveform report indicates the sampling rate, the quantization level, or both.

Example 6

An apparatus comprising at least one means for performing a method of any of examples 1 to 5.

Example 7

An apparatus for wireless communications comprising a processor; memory coupled to the processor, the processor and memory configured to cause the apparatus to perform a method of any of examples 1 to 5.

Example 8

A non-transitory computer-readable medium storing code for wireless communications, the code comprising instructions executable by a processor to perform a method of any of examples 1 to 5.

Example 9

A method for wireless communications by a user equipment (UE), comprising: receiving a waveform feedback request instructing the UE to measure a time domain waveform of a signal; identifying one or more antenna ports of the UE to use for measuring the time domain waveform; generating time domain samples of the time domain waveform using the one or more antenna ports; and transmitting a waveform report based at least in part on the time domain samples.

Example 10

The method of example 9, further comprising: generating the waveform report based at least in part on determining a compression of the time domain samples of the time domain waveform measured at respective antenna ports of the one or more antenna ports.

Example 11

The method of example 10, wherein the compression comprises a differential compression of differences between individual amplitudes, individual phases, or a combination thereof for each of the time domain samples.

Example 12

The method of any of examples 10 or 11, wherein the waveform report indicates separate phases of the time domain samples of the time domain waveform measured at each antenna port of the one or more antenna ports.

Example 13

The method of any of examples 9 to 12, wherein identifying the one or more antenna ports of the UE comprises: selecting a first antenna port of a plurality of antenna ports for measuring the time domain waveform.

Example 14

The method of example 13, wherein selecting the first antenna port comprises: selecting the first antenna port based at least in part on comparing energy received at the first antenna port relative to energy received at one or more other antenna ports of the plurality of antenna ports.

Example 15

The method of any of examples 9 to 14, wherein the one or more antenna ports is a plurality of antenna ports, further comprising: cycling between each antenna port of the plurality of antenna ports for measuring the time domain waveform in a reporting opportunity; and generating the waveform report for each reporting opportunity based at least in part on the time domain samples of the time domain waveform measured by a respective one of the plurality of antenna ports.

Example 16

The method of any of examples 9 to 15, wherein identifying the one or more antenna ports of the UE comprises: receiving an indication of which of the one or more antenna ports of the UE to use for generating the time domain samples.

Example 17

The method of any of examples 9 to 16, wherein generating the time domain samples of the time domain waveform comprises: generating the time domain samples of the time domain waveform using each of the one or more antenna ports, wherein the waveform report indicates feedback for up to all of the one or more antenna ports.

Example 18

The method of any of examples 9 to 17, wherein generating the time domain samples of the time domain waveform comprises: determining a sampling rate, a quantization level, or both based at least in part on a number of the one or more antenna ports to be used for generating the time domain samples; and generating the time domain samples based at least in part on the sampling rate, the quantization level, or both.

Example 19

The method of any of examples 9 to 18, wherein generating the time domain samples of the time domain waveform comprises: generating first time domain samples of the time domain waveform using a first antenna port during a first time interval; generating second time domain samples of the time domain waveform using a second antenna port during a second time interval; and generating the waveform report based at least in part on the first and second time domain samples.

Example 20

The method of any of examples 9 to 19, wherein identifying the one or more antenna ports of the UE comprises: selecting a subset of the one or more antenna ports for measuring the time domain waveform.

Example 21

The method of example 20, wherein selecting the subset of the one or more antenna ports comprises: selecting the subset of the one or more antenna ports based at least in part on sets of cross-poled antenna ports within the one or more antenna ports, wherein one antenna port from each set of the cross-poled antenna ports is selected for the subset of the one or more antenna ports.

Example 22

The method of any of examples 9 to 21, further comprising: generating the waveform report based at least in part on a sum of energy of the time domain waveform received by a respective antenna port of the one or more antenna ports.

Example 23

The method of example 22, wherein the sum of the energy is a non-coherent energy summation.

Example 24

The method of any of examples 9 to 23, wherein generating the time domain samples of the time domain waveform comprises: generating the time domain samples over a time duration that spans a fraction of a symbol, a single symbol, or a plurality of symbols.

Example 25

The method of any of examples 9 to 24, wherein the waveform report indicates a time mask with offset and a sampling rate, a measurement starting point and the sampling rate, or a combination thereof.

Example 26

The method of any of examples 9 to 25, wherein the waveform report indicates a plurality of measurement starting points and a corresponding plurality of measurement durations, the plurality of measurement durations occurring consecutively, in disjoint durations, or a combination thereof.

Example 27

The method of any of examples 9 to 26, further comprising: receiving control signaling configuring the UE with at least one measurement starting point and at least one measurement duration.

Example 28

The method of example 27, further comprising: selecting a sampling rate based at least in part on the at least one measurement starting point and the at least one measurement duration, wherein the time domain samples of the time domain waveform are generated based at least in part on the sampling rate, and wherein the waveform report indicates the sampling rate.

Example 29

An apparatus comprising at least one means for performing a method of any of examples 9 to 28.

Example 30

An apparatus for wireless communications comprising a processor; memory coupled to the processor, the processor and memory configured to cause the apparatus to perform a method of any of examples 9 to 28.

Example 31

A non-transitory computer-readable medium storing code for wireless communications, the code comprising instructions executable by a processor to perform a method of any of examples 9 to 28.

Example 32

A method for wireless communications by a base station, comprising: transmitting a waveform feedback request instructing a user equipment (UE) to measure a time domain waveform of a signal transmitted in a frequency resource over a measurement duration; transmitting the signal in the frequency resource at least during the measurement duration; and receiving a waveform report from the UE.

Example 33

The method of example 32, further comprising: determining a location of the UE based at least in part on the waveform report.

Example 34

The method of any of examples 32 or 33, wherein the waveform report indicates feedback generated based at least in part on time domain samples of the time domain waveform, a sampling rate of the time domain samples, a quantization level of the time domain samples, or a combination thereof.

Example 35

The method of any of examples 32 to 34, further comprising: applying digital filtering to the feedback to generate filtered feedback based at least in part on the sampling rate, the quantization level, or both; and determining a location of the UE based at least in part on the filtered feedback.

Example 36

An apparatus comprising at least one means for performing a method of any of examples 32 to 35.

Example 37

An apparatus for wireless communications comprising a processor; memory coupled to the processor, the processor and memory configured to cause the apparatus to perform a method of any of examples 32 to 35.

Example 38

A non-transitory computer-readable medium storing code for wireless communications, the code comprising instructions executable by a processor to perform a method of any of examples 32 to 35.

Example 39

A method for wireless communications by a base station, comprising: transmitting a waveform feedback request instructing a user equipment (UE) to measure a time domain waveform of a signal during a measurement duration and an indication of one or more antenna ports the UE is to use for generating time domain samples of the time domain waveform; transmitting the signal in a frequency resource at least during the measurement duration; and receiving a waveform report from the UE generated based at least in part on time domain samples of the time domain waveform.

Example 40

An apparatus comprising at least one means for performing a method of example 39.

Example 41

An apparatus for wireless communications comprising a processor; memory coupled to the processor, the processor and memory configured to cause the apparatus to perform a method of example 39.

Example 42

A non-transitory computer-readable medium storing code for wireless communications, the code comprising instructions executable by a processor to perform a method of example 39.

What is claimed is:

1. A method for wireless communications by a user equipment (UE), comprising:
 receiving a waveform feedback request instructing the UE to measure a time domain waveform of a signal transmitted in a frequency resource over a measurement duration;
 determining a sampling rate, a quantization level, or both based at least in part on a filter class of the UE, a frequency band corresponding to the frequency resource, a bandwidth of the frequency band, the measurement duration, or a combination thereof;
 generating time domain samples of the time domain waveform during the measurement duration based at least in part on the sampling rate, the quantization level, or both; and
 transmitting a waveform report based at least in part on the time domain samples.

2. The method of claim 1, wherein determining the sampling rate, the quantization level, or both comprises:
 determining an interference level within a second frequency band that is adjacent to the frequency band; and
 determining the sampling rate, the quantization level, or both based at least in part on the interference level, a distance between the second frequency band and the frequency band, or a combination thereof.

3. The method of claim 1, wherein determining the sampling rate, the quantization level, or both comprises:
 determining an interference level within a component carrier that is adjacent to the frequency resource; and
 determining the sampling rate, the quantization level, or both based at least in part on the interference level, a distance between the component carrier and the frequency resource, or a combination thereof.

4. The method of claim 1, wherein determining the sampling rate, the quantization level, or both comprises:
 determining an interference level within a bandwidth part that is adjacent to the frequency resource; and
 determining the sampling rate, the quantization level, or both based at least in part on the interference level, a distance between the bandwidth part and the frequency resource, or a combination thereof.

5. The method of claim 1, wherein the waveform report indicates the sampling rate, the quantization level, or both.

6. A method for wireless communications by a user equipment (UE), comprising:
 receiving a waveform feedback request instructing the UE to measure a time domain waveform of a signal;
 identifying one or more antenna ports of the UE to use for measuring the time domain waveform;
 generating time domain samples of the time domain waveform using the one or more antenna ports; and
 transmitting a waveform report based at least in part on the time domain samples.

7. The method of claim 6, further comprising:
 generating the waveform report based at least in part on determining a compression of the time domain samples of the time domain waveform measured at respective antenna ports of the one or more antenna ports.

8. The method of claim 7, wherein the compression comprises a differential compression of differences between individual amplitudes, individual phases, or a combination thereof for each of the time domain samples.

9. The method of claim 7, wherein the waveform report indicates separate phases of the time domain samples of the time domain waveform measured at each antenna port of the one or more antenna ports.

10. The method of claim 6, wherein identifying the one or more antenna ports of the UE comprises:
 selecting a first antenna port of a plurality of antenna ports for measuring the time domain waveform.

11. The method of claim 10, wherein selecting the first antenna port comprises:
 selecting the first antenna port based at least in part on comparing energy received at the first antenna port relative to energy received at one or more other antenna ports of the plurality of antenna ports.

12. The method of claim 6, wherein the one or more antenna ports is a plurality of antenna ports, further comprising:
 cycling between each antenna port of the plurality of antenna ports for measuring the time domain waveform in a reporting opportunity; and
 generating the waveform report for each reporting opportunity based at least in part on the time domain samples of the time domain waveform measured by a respective one of the plurality of antenna ports.

13. The method of claim 6, wherein identifying the one or more antenna ports of the UE comprises:
 receiving an indication of which of the one or more antenna ports of the UE to use for generating the time domain samples.

14. The method of claim 6, wherein generating the time domain samples of the time domain waveform comprises:
 generating the time domain samples of the time domain waveform using each of the one or more antenna ports, wherein the waveform report indicates feedback for up to all of the one or more antenna ports.

15. The method of claim 6, wherein generating the time domain samples of the time domain waveform comprises:
 determining a sampling rate, a quantization level, or both based at least in part on a number of the one or more antenna ports to be used for generating the time domain samples; and
 generating the time domain samples based at least in part on the sampling rate, the quantization level, or both.

16. The method of claim 6, wherein generating the time domain samples of the time domain waveform comprises:
generating first time domain samples of the time domain waveform using a first antenna port during a first time interval;
generating second time domain samples of the time domain waveform using a second antenna port during a second time interval; and
generating the waveform report based at least in part on the first time domain samples and the second time domain samples.

17. The method of claim 6, wherein identifying the one or more antenna ports of the UE comprises:
selecting a subset of the one or more antenna ports for measuring the time domain waveform.

18. The method of claim 17, wherein selecting the subset of the one or more antenna ports comprises:
selecting the subset of the one or more antenna ports based at least in part on sets of cross-poled antenna ports within the one or more antenna ports, wherein one antenna port from each set of the cross-poled antenna ports is selected for the subset of the one or more antenna ports.

19. The method of claim 6, further comprising:
generating the waveform report based at least in part on a sum of energy of the time domain waveform received by a respective antenna port of the one or more antenna ports.

20. The method of claim 19, wherein the sum of the energy is a non-coherent energy summation.

21. The method of claim 6, wherein generating the time domain samples of the time domain waveform comprises:
generating the time domain samples over a time duration that spans a fraction of a symbol, a single symbol, or a plurality of symbols.

22. The method of claim 6, wherein the waveform report indicates a time mask with offset and a sampling rate, a measurement starting point and the sampling rate, or a combination thereof.

23. The method of claim 6, wherein the waveform report indicates a plurality of measurement starting points and a corresponding plurality of measurement durations, the corresponding plurality of measurement durations occurring consecutively, in disjoint durations, or a combination thereof.

24. The method of claim 6, further comprising:
receiving control signaling configuring the UE with at least one measurement starting point and at least one measurement duration.

25. The method of claim 24, further comprising:
selecting a sampling rate based at least in part on the at least one measurement starting point and the at least one measurement duration, wherein the time domain samples of the time domain waveform are generated based at least in part on the sampling rate, and wherein the waveform report indicates the sampling rate.

26. A method for wireless communications by a base station, comprising:
transmitting a waveform feedback request instructing a user equipment (UE) to measure a time domain waveform of a signal transmitted in a frequency resource over a measurement duration;
transmitting the signal in the frequency resource at least during the measurement duration; and
receiving a waveform report from the UE.

27. The method of claim 26, further comprising:
determining a location of the UE based at least in part on the waveform report.

28. The method of claim 26, wherein the waveform report indicates feedback generated based at least in part on time domain samples of the time domain waveform, a sampling rate of the time domain samples, a quantization level of the time domain samples, or a combination thereof.

29. The method of claim 28, further comprising:
applying digital filtering to the feedback to generate filtered feedback based at least in part on the sampling rate, the quantization level, or both; and
determining a location of the UE based at least in part on the filtered feedback.

30. A method for wireless communications by a base station, comprising:
transmitting a waveform feedback request instructing a user equipment (UE) to measure a time domain waveform of a signal during a measurement duration and an indication of one or more antenna ports the UE is to use for generating time domain samples of the time domain waveform;
transmitting the signal in a frequency resource at least during the measurement duration; and
receiving a waveform report from the UE generated based at least in part on time domain samples of the time domain waveform.

31. An apparatus for wireless communications by a user equipment (UE), comprising: a processor, memory in electronic communication with the processor; and instructions stored in the memory and executable by the processor to cause the apparatus to:
receive a waveform feedback request instructing the UE to measure a time domain waveform of a signal transmitted in a frequency resource over a measurement duration;
determine a sampling rate, a quantization level, or both based at least in part on a filter class of the UE, a frequency band corresponding to the frequency resource, a bandwidth of the frequency band, the measurement duration, or a combination thereof;
generate time domain samples of the time domain waveform during the measurement duration based at least in part on the sampling rate, the quantization level, or both; and
transmit a waveform report based at least in part on the time domain samples.

32. The apparatus of claim 31, wherein the instructions to determine the sampling rate, the quantization level, or both are executable by the processor to cause the apparatus to:
determine an interference level within a second frequency band that is adjacent to the frequency band; and
determine the sampling rate, the quantization level, or both based at least in part on the interference level, a distance between the second frequency band and the frequency band, or a combination thereof.

33. The apparatus of claim 31, wherein the instructions to determine the sampling rate, the quantization level, or both are executable by the processor to cause the apparatus to:
determine an interference level within a component carrier that is adjacent to the frequency resource; and
determine the sampling rate, the quantization level, or both based at least in part on the interference level, a distance between the component carrier and the frequency resource, or a combination thereof.

34. The apparatus of claim 31, wherein the instructions to determine the sampling rate, the quantization level, or both are executable by the processor to cause the apparatus to:
- determine an interference level within a bandwidth part that is adjacent to the frequency resource; and
- determine the sampling rate, the quantization level, or both based at least in part on the interference level, a distance between the bandwidth part and the frequency resource, or a combination thereof.

* * * * *